(12) United States Patent
Davidson

(10) Patent No.: US 9,919,269 B2
(45) Date of Patent: Mar. 20, 2018

(54) CLEAN COAL STACK

(71) Applicant: 3 D CLEAN COAL EMISSIONS STACK, LLC, Powell, OH (US)

(72) Inventor: James Gary Davidson, Buchanan, TN (US)

(73) Assignee: 3D Clean Coal Emissions Stack LLC, Powell, OH (US)

( * ) Notice: Subject to any disclaimer, the term of this patent is extended or adjusted under 35 U.S.C. 154(b) by 0 days.

(21) Appl. No.: 15/067,569

(22) Filed: Mar. 11, 2016

(65) Prior Publication Data

US 2016/0199780 A1    Jul. 14, 2016

Related U.S. Application Data

(63) Continuation-in-part of application No. 14/722,244, filed on May 27, 2015, now Pat. No. 9,737,849, which is a continuation of application No. 14/214,247, filed on Mar. 14, 2014, now Pat. No. 9,067,837, which is a continuation-in-part of application No. 13/841,339, filed on Mar. 15, 2013, now Pat. No. 8,821,818.

(51) Int. Cl.
| | |
|---|---|
| *B01D 53/86* | (2006.01) |
| *B01D 53/64* | (2006.01) |
| *B01D 53/62* | (2006.01) |
| *B01D 53/56* | (2006.01) |
| *B01D 53/50* | (2006.01) |
| *B01D 53/32* | (2006.01) |
| *B01D 53/26* | (2006.01) |
| *C05C 5/00* | (2006.01) |
| *B01D 53/88* | (2006.01) |
| *C05D 9/00* | (2006.01) |
| *F23J 15/02* | (2006.01) |

(52) U.S. Cl.
CPC ....... *B01D 53/8609* (2013.01); *B01D 53/261* (2013.01); *B01D 53/32* (2013.01); *B01D 53/864* (2013.01); *B01D 53/869* (2013.01); *B01D 53/8628* (2013.01); *B01D 53/8637* (2013.01); *B01D 53/8665* (2013.01); *B01D 53/8693* (2013.01); *B01D 53/885* (2013.01); *C05C 5/00* (2013.01); *C05D 9/00* (2013.01); *F23J 15/02* (2013.01); B01D 2255/50 (2013.01); B01D 2257/502 (2013.01); B01D 2257/504 (2013.01); B01D 2257/602 (2013.01); B01D 2258/0283 (2013.01); F23J 2219/10 (2013.01); Y02E 20/326 (2013.01); Y02P 20/152 (2015.11)

(58) Field of Classification Search
CPC .............. B01D 53/261; B01D 53/8628; B01D 53/8665; B01D 53/869; B01D 53/8693; B01D 53/865; B01D 2255/50; B01D 2257/502; B01D 2257/504; B01D 2257/602; B01D 2258/0283; B01D 53/8609; B01D 53/8637; B01D 53/68; B01D 53/864; B01D 53/32; B01D 53/323; B01D 2257/302; B01D 2257/404; B01D 2257/402; B01D 53/50; B01D 53/56; B01D 53/62; B01D 53/64; Y02E 20/326; C05C 5/00; C05D 9/00; F23J 15/02; F23J 2219/10; Y02P 20/152
See application file for complete search history.

(56) References Cited

U.S. PATENT DOCUMENTS

| | | | |
|---|---|---|---|
| 3,359,707 A * | 12/1967 | Jean ......................... | A61L 9/03 95/123 |
| 3,895,094 A | 7/1975 | Carter et al. | |
| 4,038,050 A * | 7/1977 | Lowther .............. | G01N 27/043 95/1 |
| 4,052,337 A | 10/1977 | Nishikawa et al. | |
| 4,133,671 A | 1/1979 | Mikel | |
| 4,297,328 A | 10/1981 | Ritscher et al. | |
| 4,735,930 A | 4/1988 | Gerdes et al. | |
| 4,748,012 A | 5/1988 | Weber et al. | |
| 4,946,659 A | 8/1990 | Held et al. | |
| 5,041,270 A | 8/1991 | Fujitani et al. | |
| 5,041,272 A | 8/1991 | Tamura et al. | |
| 5,085,840 A | 2/1992 | Held et al. | |
| 5,143,707 A | 9/1992 | Beck et al. | |
| 5,160,033 A | 11/1992 | Vassilakis et al. | |
| 5,186,903 A | 2/1993 | Cornwell | |
| 5,223,237 A | 6/1993 | Simpson et al. | |
| 5,270,024 A | 12/1993 | Kasahara et al. | |
| 5,417,949 A | 5/1995 | McWilliams et al. | |
| 5,417,950 A | 5/1995 | Sheu et al. | |
| 5,429,842 A | 7/1995 | Appel et al. | |
| 5,482,692 A | 1/1996 | Audeh et al. | |
| 5,520,895 A | 5/1996 | Sharma et al. | |
| 5,536,483 A | 7/1996 | Descat et al. | |
| 5,589,147 A | 12/1996 | Farnos et al. | |
| 5,629,842 A | 5/1997 | Johnson et al. | |
| 5,631,818 A | 5/1997 | Johnson et al. | |
| 5,740,024 A | 4/1998 | Johnson et al. | |
| 5,776,324 A | 7/1998 | Usala | |
| 5,871,703 A | 2/1999 | Alix et al. | |
| 5,903,450 A | 5/1999 | Johnson et al. | |
| 5,920,474 A | 7/1999 | Johnson et al. | |

(Continued)

FOREIGN PATENT DOCUMENTS

| | | |
|---|---|---|
| DE | 4443301 | 6/1996 |
| EP | 0393917 | 10/1990 |

(Continued)

*Primary Examiner* — Timothy C Vanoy
(74) *Attorney, Agent, or Firm* — Hahn Loeser & Parks LLP

(57) ABSTRACT

A method and apparatus for cleaning and recycling stack gas from coal-fired power plants, from natural or propane burning heating plants, or from cement kilns by using renewable catalysts of zeolite to separate pollutants into recyclable and reusable materials. The method reduces from the stack gas carbon monoxide (CO), carbon dioxide ($CO_2$), nitrogen oxide (NOx), sulfur oxide (SOx) as well as halogens such as chloride and fluorides and trace metals particularly, mercury, lead, and zinc.

65 Claims, 10 Drawing Sheets

(56) References Cited

U.S. PATENT DOCUMENTS

| | | |
|---|---|---|
| 6,117,403 A | 9/2000 | Alix et al. |
| 6,132,692 A | 10/2000 | Alix et al. |
| 6,171,556 B1 | 1/2001 | Burk et al. |
| 6,221,324 B1 | 4/2001 | Coq et al. |
| 6,605,263 B2 | 8/2003 | Alix et al. |
| 6,638,342 B2 | 10/2003 | Gansley et al. |
| 6,689,709 B1 | 2/2004 | Tran et al. |
| 6,914,026 B2 | 7/2005 | Tran et al. |
| 6,936,231 B2 | 8/2005 | Duncan et al. |
| 6,991,771 B2 | 1/2006 | Duncan et al. |
| 7,048,899 B2 | 5/2006 | Alix et al. |
| 7,052,662 B2 | 5/2006 | Duncan et al. |
| 7,118,722 B2 | 10/2006 | Tran et al. |
| 7,399,453 B2 | 7/2008 | Kelley et al. |
| 7,404,940 B2 | 7/2008 | Higgins et al. |
| 7,704,475 B2 | 4/2010 | Bull et al. |
| 7,968,068 B2 | 6/2011 | Bull et al. |
| 8,071,043 B2 | 12/2011 | Como et al. |
| 8,092,270 B2 | 1/2012 | Sterndale et al. |
| 8,821,818 B1 * | 9/2014 | Davidson .............. C05C 5/00 422/168 |
| 9,067,837 B2 * | 6/2015 | Davidson .............. C05D 9/00 |
| 2001/0001435 A1 * | 5/2001 | Palekar ............ B01D 53/8631 204/164 |
| 2001/0014304 A1 | 8/2001 | Satokawa et al. |
| 2004/0053773 A1 | 3/2004 | Sarkar et al. |
| 2004/0109805 A1 | 6/2004 | Schweter et al. |
| 2004/0219084 A1 * | 11/2004 | Hall .................. B01D 53/32 423/235 |
| 2005/0178303 A1 | 8/2005 | Higgins |
| 2005/0214181 A1 * | 9/2005 | Kaneko ............... B01D 53/32 422/186.04 |
| 2005/0260114 A1 | 11/2005 | Higgins et al. |
| 2007/0157690 A1 | 7/2007 | Chen et al. |
| 2008/0044331 A1 | 2/2008 | Schweter et al. |
| 2010/0083828 A1 | 4/2010 | Duncan et al. |
| 2010/0089110 A1 | 4/2010 | Duncan et al. |
| 2010/0319542 A1 | 12/2010 | Alix et al. |
| 2011/0052453 A1 | 3/2011 | McLarnon et al. |
| 2011/0110841 A1 | 5/2011 | Mahoney et al. |
| 2011/0125326 A1 | 5/2011 | Bosco et al. |
| 2013/0269525 A1 | 10/2013 | Alix et al. |

FOREIGN PATENT DOCUMENTS

| | | |
|---|---|---|
| GB | 2051030 | 1/1981 |
| WO | 2004002611 | 1/2001 |
| WO | 2004047960 | 6/2004 |

* cited by examiner

CLEAN COAL STACK

RELATED APPLICATIONS

This application is a continuation-in-part of U.S. patent application Ser. No. 14/722,244, filed May 27, 2015, which is a continuation of U.S. patent application Ser. No. 14/214,247 (now U.S. Pat. No. 9,067,837), filed Mar. 14, 2014, which is a continuation-in-part of U.S. patent application Ser. No. 13/841,339 (now U.S. Pat. No. 8,821,818), filed Mar. 15, 2013.

BACKGROUND AND SUMMARY

This invention relates to cleaning of stack gases such as those from coal fired power plants, from natural or propane burning heating plants, or from cement kilns. The stack gases exhausted from such facilities are controlled by environmental regulations. Such regulations require abatement of carbon monoxide (CO), carbon dioxide ($CO_2$), nitrogen oxide (NOx), sulfur oxide (SOx) as well as halogens (such as chloride and fluorides) and trace metals, particularly mercury, lead, and zinc.

Various methods and apparatuses have been proposed for abating these pollutants in stack gases. In particular, a variety of methods have been proposed for reducing pollutants released from coal-fired stack gas. One method of cleaning coal-fired stack gas is the use of scrubbers that inject a liquid or slurry into a gas stream that washes various pollutants, such as with acidic compounds, from the stack gas stream. Another type of cleaning is the use of an exhaust burner that combusts volatile materials and other combustible compounds reducing pollution in the stack gas.

Specifically, it has been proposed that the stack gases be mixed with ammonia or urea and then passed through a catalyst in which the ammonia reacts selectively with the nitrous oxides to form nitrogen gas in water vapor, or combustion of a sulfur-containing fossil fuel in the presence of a calcium carbonate or magnesium carbonate to form calcium sulfate or magnesium sulfate. See U.S. Pat. Nos. 8,181,451; 6,706,246; 5,525,317; 5,237,939; 4,185,080; and 4,051,225. It has also been proposed to reduce nitrogen in stack gas by passing the stack gas through a heat exchange having a SCR catalyst. See U.S. Pat. No. 5,918,555. Reduction of sulfur oxide content in stack gases gas been proposed involving catalyzed oxidation to sulfur trioxide in the presence of an absorbent or combusting sulfur-containing fuel in a combustion zone charged with a slurry in sulfuric acid solution. See U.S. Pat. Nos. 5,540,755; 4,649,034; 4,284,015; and 4,185,080. Catalytically converting unburned hydrocarbons and carbon monoxide to carbon dioxide and reducing nitrogen oxides to nitrogen subsequent to the combustion of fossil fuels, while absorbing sulfur oxide has been proposed, where the catalytic material is physically combined onto a dry powder of an adsorbent matrix selected from calcium aluminate, calcium aluminate cement, barium titanate, and calcium titanate. See U.S. Pat. No. 4,483,259. It has also been proposed to pass the stack gases through a catalyst bed of a combination of active metals on the surface that is capable of reducing or converting sulfur oxides, carbon monoxide and hydrocarbons to inert compounds such as carbon dioxide, water and nitrogen. See U.S. Pat. No. 7,399,458. Levels of mercury in stack gases from coal combustion have also been reduced by introducing a sorbent composition into the gas stream in a zone where temperature is greater than 500° C., where the sorbent composition comprises an effective amount of nitrate salt and/or a nitrite salt. See U.S. Pat. Nos. 7,468,170 and 7,731,781.

Other types of cleaning stack gas have also been proposed and will be known to those having skill in the art. These previous proposals have a number of drawbacks. Many require addition of another gas or liquid such as ammonia, sulfuric acid, or the presence of an active metal catalyst.

One particular problem unresolved by current technology is carbon gaseous pollutants that cannot be reduced by scrubbing or combustion. It has been proposed to capture the carbon in the form of carbon dioxide, compress the carbon dioxide, and storing it in a geological formation. Zeolite has been proposed among others materials to absorb carbon dioxide, and after sequestering the carbon dioxide then to be able to regenerate the zeolite material. See "*Carbon Dioxide Capture Using a Zeolite Molecular Sieve Sampling System for Isotopic Studies ($^{13}C$ and $^{14}C$) of Respiration*", Radiocarbon, 47, 441-451 (2005); "*Absorbent Materials for Carbon Dioxide Capture from Large Anthropogenic Point Sources*", Chem Sus Chem 2009, 2, 796-854; "*NIST Provides Octagonal Window of Opportunity for Carbon Capture*", NIST Techbeat, Feb. 7, 2012. However, these uses of zeolite generally involved large particle sizes of zeolite; for example, between $\frac{1}{16}$ and $\frac{1}{8}$ inch in size under conditions to provide for adsorption of carbon dioxide and later regeneration. These methods of absorbing carbon dioxide highlight the continuing problem of disposing of sequestered carbon dioxide.

There is therefore still a need for a method and apparatus to effectively remove carbon monoxide, carbon dioxide, nitrogen oxides, sulfur oxides and trace metals, such as mercury, from stack gases without consuming expensive catalysts, without injecting additional gases, liquids and/or solids into the stack gas, and without creating waste products that themselves present problems and costs in disposal. This is of particular concern in cleaning of stack gases coal from power plants because of the release of volatiles such as coal tar and other active pollutants along with carbon dioxide in the stack gas.

However, an added problem is the water vapor content of the stack gas reaching the cleaning system. The moisture content of typical stack gas exited from a baghouse and directed to a cleaning system is typically 12% to 14% water, or higher, and the difficulty of stack gas cleaning with the available water vapor content causes the catalyst to be swamped and inoperative for commercial applications. The catalyst is inoperative to reduce carbon monoxide, carbon dioxide, nitrogen oxides and sulfur oxides to produce oxygen and residuals. Therefore there is still a need for an effective and commercially viable method of reducing the water vapor content of stack gas before reaching the catalyst so that the catalyst can effectively reduce carbon monoxide, carbon dioxide, nitrous oxides and sulfur oxides to oxygen and residuals.

Presently disclosed is an apparatus for drying and cleaning stack gases comprising: (a) a first catalytic flow-through bed of natural calcium zeolite with a porosity of a total surface area of not greater than 1200 $m^2/g$ adapted to reduce carbon oxides present in an exhaust stack; (b) a second catalytic flow-through bed of a blend of natural sodium zeolite and natural calcium zeolite of a porosity with a total surface area of not greater than 1200 $m^2/g$ adapted to reduce sulfur oxides present in the exhaust stack downstream of the first bed; (c) a third catalytic flow-through bed of natural calcium zeolite with a porosity of a total surface area not greater than 1200 $m^2/g$ adapted to reduce nitrogen oxides present in the exhaust stack downstream of the second bed;

(d) a pair of electrodes adapted to be positioned inline in the gas flow upstream of the first catalytic flow-through bed and insulated from containment of the gas flow, such as with a pipe, and applying D.C. voltage between the electrodes to ionize water vapor without creating substantial amounts of hydrogen gas and reduce moisture content of the gas flow through the catalytic flow-through beds; (d) an exhaust stack adapted to provide a gas flow, selected from the group consisting of volatiles from combustion of coal or from combustion of natural gas or from a cement kiln, sequentially past the pair of electrodes and through the first catalytic flow-through bed, the second catalytic flow-through bed, and the third catalytic flow-through bed, each catalytic bed collecting residuals, and providing stack gases exiting the third catalytic flow-through bed with at least 70% reduction in sulfur oxides, nitrogen oxides, and carbon oxides; and (e) the first catalytic flow-through bed, the second catalytic flow-through bed, and the third catalytic flow-through bed each adapted to be periodically purged with nitrogen to remove solids and/or liquids collected in the first catalytic flow-through bed, the second catalytic flow-through bed, and/or the third catalytic flow-through bed so each catalytic flow-through bed can be prepared for reuse. Note the first catalytic flow-through bed, the second catalytic flow-through bed, and the third catalytic flow-through bed may include other zeolites particle sizes as explained in more detail below.

The electrodes may be positioned in the gas flow downstream of a baghouse. The D.C. voltage applied between the electrodes may be less than 34 volts which may be effective to ionize the water vapor as previously described, but be sufficiently low to avoid the presence of hydrogen gas in substantial quantities downstream of the catalytic beds in the stack gas stream, as described. The electrodes in the gas flow upstream of the first catalytic flow-through bed insulated from containment of the gas flow may apply such voltage to ionize water vapor in the gas flow and reduce moisture content of the gas flow in the first catalytic flow-through bed to be below 8% or 5% or a lower or different moisture content as desired.

The exhaust stack may be adapted to exit gases from the third catalytic flow-through bed with at least 80% or 90% reduction in carbon oxides, sulfur oxides, and nitrogen oxides compared to the stack gases after reaching the electrodes.

The apparatus in addition may have a venturi positioned in the gas flow downstream of the third catalytic flow-through bed to stabilize gas flow through the beds. The apparatus may also include stabilizing veins to improve laminar flow of the stack gases through the beds. Stabilizing veins may improve efficiency of separation of pollutants from the stack gases. Stabilizing veins may be positioned upstream or downstream of the electrodes in the gas stream, but may be more advantageously positioned downstream of the electrodes.

The blend of natural sodium zeolite and natural calcium zeolite in the second catalytic flow-through bed may be between 25% and 75%.

The first catalytic flow-through bed, the second catalytic flow-through bed, and the third catalytic flow-through bed may also each have a porosity of total surface area not greater than 800 m$^2$/g. Also a fourth catalytic flow-through bed of calcium zeolite may also be provided in the gas flow after passing the pair of electrodes and before the first catalytic flow-through bed with a porosity of total surface area not greater than 1200 m$^2$/g, or not greater than 800 m$^2$/g, adapted to collect bauxite compounds before passage through the first catalytic flow-through bed. The fourth catalytic flow-through bed also may be adapted to be periodically purged with nitrogen. Where a fourth catalytic flow-through bed is provided, exhaust stack gases may exit from the third catalytic flow-through bed with at least 70% or 90% reduction in bauxite compounds, carbon oxides, sulfur oxides, nitrogen oxides, and mercury oxides compared to the stack gases delivered through the pair of electrodes.

The apparatus may comprise at least two series of sequential gas flows both through a pair of electrodes, a first catalytic flow-through bed, a second catalytic flow-through bed, and a third catalytic flow-through bed, provided in parallel, so stack gases can be cleaned through one of the series of beds while other series of beds can be purged.

Also disclosed is a method of drying and cleaning stack gases comprising the steps of:

(a) passing a contained stack gas flow, selected from the group consisting of volatiles from combustion of coal or from combustion of natural gas or from a cement kiln, through a pair of electrodes adapted to be positioned inline in the gas flow and applying a D.C. voltage between the electrodes to reduce moisture content of the gas flow through the catalytic flow-through beds without creating substantial amounts of hydrogen gas;

(b) passing stack gas flow from the electrodes through a first catalytic flow-through bed of calcium zeolite comprising natural zeolite particles of a majority between 44 μm and 64 μm in size at a temperature above the dew point between 125° F. and 500° F. and a pressure between 3 psi and 200 psi adapted to reduce carbon oxides in the stack gas flow;

(c) passing the stack gas flow from the first catalytic flow-through bed through a second catalytic flow-through bed of a blend between 25% and 75% of sodium zeolite and calcium zeolite comprising natural sodium and calcium zeolite particles of a majority between 65 μm and 125 μm in size at a temperature above the dew point between 125° F. and 500° F. and a pressure between 3 psi and 200 psi adapted to reduce sulfur oxides in the stack gas flow;

(d) passing the stack gas flow from the second catalytic flow-through bed through a third catalytic flow-through bed of calcium zeolite comprising natural zeolite particles of a majority between 78 μm and 204 μm at a temperature above the dew point between 125° F. and 500° F. and a pressure between 3 psi and 200 psi adapted to reduce nitrogen oxides in the stack gas flow; and (e) operating the stack gas flow sequentially past the pair of electrodes and through the first catalytic bed, the second catalytic bed, and the third catalytic bed to provide at least 70% reduction in sulfur oxides, nitrogen oxides and carbon oxide in the stack gas flow.

In the method, the voltage between the electrodes may be below 34 volts, and the gas flow sequentially circulated past the pair of electrodes and through the first catalytic flow-through bed, the second catalytic flow-through bed, and the third catalytic flow-through bed also may remove from the gas flow at least 50% or 70% of mercury in all forms. The pair of electrodes in step (a) may also be positioned in the gas flow downstream of a baghouse. The method of drying and cleaning stack gas may also have the pair of electrodes in the gas flow upstream of the first catalytic flow-through bed insulated from containment of the gas flow with D.C. voltage applied to the electrodes to ionize water vapor in the gas flow and reduce moisture content of the gas flow in the first catalytic flow-through bed, preferably to below 8% or 5%% or a lower or different moisture content as desired.

Alternatively, a method of drying and cleaning stack gases is disclosed comprising the steps of:

(a) passing a contained stack gas flow selected from the group consisting of volatiles from combustion of coal or from combustion of natural gas or from a cement kiln by a pair of electrodes positioned inline in the gas flow and applying a D.C. voltage between the electrodes to ionize water vapor in the gas flow without creating substantial amounts of hydrogen gas and to reduce moisture content of the gas flow in the catalytic flow-through beds to the moisture content in the gas flow before reaching the pair of electrodes;

(b) passing stack gas flow from the pair of electrodes through a first catalytic flow-through bed comprised of calcium zeolite of natural zeolite particles of a majority between 44 µm and 64 µm in size at a temperature above the dew point between 125° F. and 500° F. and a pressure between 3 psi and 200 psi adapted to reduce carbon oxides in the stack gases;

(c) passing the stack gas flow from the first catalytic flow-through bed through a second catalytic flow-through bed comprised of a blend between 25 and 75% of sodium zeolite and calcium zeolite of natural sodium and calcium zeolite particles of a majority between 65 µm and 125 µm in size at a temperature above the dew point between 125° F. and 500° F. and a pressure between 3 psi and 200 psi adapted to reduce sulfur oxides in the stack gases;

(d) passing the stack gas flow from the second catalytic flow-through bed through a third catalytic flow-through bed comprised of calcium zeolite of natural zeolite particles of a majority between 78 µm and 204 µm at a temperature above the dew point between 125° F. and 500° F. and a pressure between 3 psi and 200 psi adapted to reduce nitrogen oxides in the stack gases and providing a stack gas flow exiting the third catalytic bed with at least 70% reduction in sulfur oxides, nitrogen oxides and carbon oxide; and (e) purging residuals from the first catalytic bed, the second catalytic bed, and the third catalytic bed by intermittently passing liquid or gaseous nitrogen through the beds to remove solids and liquids collected from the stack gas flow by the beds.

In the alternative method of drying and cleaning stack gas described above, the voltages between the electrodes may be less than 34 volts, and the stack gas may have the flow sequentially circulated past the same or a different pair of electrodes and through the series of a first catalytic flow-through bed, a second catalytic flow-through bed, and a third catalytic flow-through bed.

The method also may remove from the gas flow at least 50% of mercury or at least 70% of mercury in all forms.

The electrodes in step (a) of the alternative method of cleaning and drying may be positioned in the gas flow downstream of a baghouse. The alternative method of drying and cleaning stack gas may also have the additional step of passing the gas flow through a venturi positioned downstream of the third catalytic flow-through bed to stabilize the gas flow through the beds.

The alternative method of drying and cleaning stack gas may also comprise a fourth catalytic flow-through bed of calcium zeolite comprising natural zeolite particles between 44 µm and 64 µm in size positioned in the stack gas flow after the pair of electrodes and before the first catalytic bed with an electrical charge on said fourth catalytic flow-through bed to separately collect bauxite compounds from the stack gas flow before passing through the first catalytic bed. The stack gas exiting a stack from the third catalytic bed may have at least 70% or 90% reduction in bauxite compounds, carbon oxides, sulfur oxides, nitrogen oxides, and mercury oxide compared to the stack gas flow delivered through the stack.

The alternative method of drying and cleaning stack gas may have the pair of electrodes positioned in the gas flow upstream of the first catalytic flow-through bed insulated from containment of the gas flow with applied direct voltage to ionize water vapor without creating substantial amounts of hydrogen gas in the gas flow and reduce moisture content of the gas flow through the catalytic flow-through beds to below, for example, 8% or 5% or a lower or different moisture content as desired.

The alternative method of drying and cleaning stack gas may comprise the additional step of passing the gas flow through a venturi positioned downstream of the third catalytic flow-through bed to stabilize the gas flow through the beds.

The alternative method of drying and cleaning stack gas may have at least two series of stack gas flows are provided in parallel to provide for the gas flow to passed a pair of electrodes inline and through a first catalytic bed, a second catalytic bed, and a third catalytic bed to enable at least one bed in series of beds can be purged while the stack gas flow continues to be dried and cleaned through a series of beds and optionally another pair of electrodes.

A second alternative method of drying and cleaning stack gases is disclosed comprising the steps of:

(a) passing a stack gas flow of less than 7% oxygen selected from the group consisting of volatiles from combustion of coal or from combustion of natural gas or from a cement kiln by a pair of electrodes positioned generally inline in the gas flow and to ionize water vapor without creating substantial amounts of hydrogen gas and reduce moisture content of the gas flow through the catalytic flow-through bed as described below, (b) passing the gas flow from the from the pair of electrodes through a first catalytic flow-through bed comprised of calcium zeolite of natural zeolite particles at a temperature above the dew point between 125° F. and 500° F. and a pressure between 3 psi and 200 psi adapted to reduce carbon oxides from the stack gases and increase oxygen levels in the stack gases;

(c) passing the gas flow from the first catalytic flow-through bed through a second catalytic flow-through bed comprised of a blend between 25 and 75% of sodium zeolite and calcium zeolite of natural sodium and calcium zeolite particles at a temperature above the dew point between 125° F. and 500° F. and a pressure between 3 psi and 200 psi adapted to reduce sulfur oxides from the stack gases and increase oxygen levels in the stack gases;

(d) passing the gas flow from the second catalytic flow-through bed through a third catalytic flow-through bed comprised of calcium zeolite of natural zeolite particles at a temperature above the dew point between 125° F. and 500° F. and a pressure between 3 psi and 200 psi adapted to reduce nitrogen oxides in the stack gases and increase oxygen levels in the stack gas and providing gas exiting the third catalytic bed with at least 70% reduction in carbon oxides, sulfur oxides, and nitrogen oxides and greater than 15% oxygen.

The electrodes in step (a) may be positioned in the gas flow downstream of a baghouse and the voltage between the electrodes may be less than 34 volts. Also the second alternative method of drying and cleaning stack gas may have the pair of electrodes in the gas flow upstream of the first catalytic flow-through bed insulated from containment of the gas flow with an applied voltage to the electrodes to ionize water vapor in the gas flow and reduce moisture content of the gas flow in the first catalytic flow-through bed.

The second alternative method of drying and cleaning stack gas may have the stack gas flow sequentially circulated past the pair of electrodes and through the first catalytic flow-through bed, the second catalytic flow-through bed, and the third catalytic flow-through bed also removes from the gas flow at least 50% or at least 70% of mercury in all forms.

The second alternative method of drying and cleaning stack gas may comprise the additional step of passing the gas flow through a venturi positioned downstream of the third catalytic flow-through bed to stabilize the gas flow through the beds.

The second alternative method of drying and cleaning stack gas may comprise in addition a fourth catalytic flow-through bed of calcium zeolite comprising natural zeolite particles between 44 μm and 64 μm in size positioned in the stack gas flow after the pair of electrodes and before the first catalytic bed with an electrical charge on said fourth catalytic flow-through bed to separately collect bauxite compounds from the stack gas flow before passing through the first catalytic bed. In this alternative method of drying and cleaning stack gas may have the stack gas exiting a stack from the third catalytic bed may have at least 70% or at least 90% reduction in bauxite compounds, carbon oxides, sulfur oxides, nitrogen oxides, and mercury oxide compared to the stack gas flow delivered through the stack.

The second alternative method of drying and cleaning stack gas may have at least two series of stack gas flows provided in parallel to pass the same or a different pair of electrodes inline to dry the stack gas by applying a voltage between the electrodes to ionize the water vapor without creating substantial amounts of hydrogen gas and through a series of a first catalytic bed, a second catalytic bed, and a third catalytic bed so that one stack gas flow can be dried and cleaned by the method described, while an alternative series of a first catalytic bed, a second catalytic bed, and a third catalytic bed may be purged for reuse.

A third alternative method of drying and cleaning stack gases is disclosed comprising the steps of:
(a) passing a stack gas flow selected from the group consisting of volatiles from combustion of coal or from combustion of natural gas or from a cement kiln by at least two electrodes positioned generally inline in the gas flow and applying a D.C. voltage between the electrodes sufficient to ionize the water vapor in the stack gas flow without creating substantial amounts of hydrogen gas and reduce moisture content of the gas flow through the catalytic flow-through beds described below,
(b) passing the gas flow from the pair of electrodes through a first catalytic flow-through bed comprised of calcium zeolite with a porosity of a total surface area not greater than 1200 $m^2/g$ to reduce carbon oxides from the stack gases and increase oxygen levels in the stack gas;
(c) passing the gas flow from the first catalytic flow-through bed through a second catalytic flow-through bed comprised of a blend between 25% and 75% of sodium zeolite and calcium zeolite with a porosity of a total surface area not greater than 1200 $m^2/g$ to reduce sulfur oxides from the gas flow and increase oxygen levels in the gas flow; and
(d) passing the gas flow from the second catalytic flow-through bed through a third catalytic flow-through bed comprised of calcium zeolite comprising natural zeolite particles with a porosity of a total surface area not greater than 1200 $m^2/g$ to reduce nitrogen oxides and providing gas exiting the third catalytic bed with at least 70% reduction in sulfur oxides, nitrogen oxides and carbon oxides and greater than 15% oxygen.

The electrodes in step (a) of this third alternative method may be positioned in the gas flow downstream of a baghouse. This third alternative method of drying and cleaning stack gas may also provide the pair of electrodes in the gas flow upstream of the first catalytic flow-through bed and insulated from containment of the gas flow, and may apply D.C. voltage less than 34 volts to ionize water vapor in the gas flow and reduce moisture content of the gas flow in the first catalytic flow-through bed, preferably to below 8% or 5% or a lower or different moisture content as desired.

Note that in the method and alternative methods described above, the first catalytic flow-through bed, the second catalytic flow-through bed, and the third catalytic flow-through bed may include other sizes of particles of zeolite as explained in more detail below.

In the third alternative method of drying and cleaning stack gas, an additional fourth catalytic flow-through bed of calcium zeolite comprising natural zeolite particles with a porosity of a total surface area not greater than 1200 $m^2/g$ may be positioned in the stack gas flow after the pair of electrodes and before the first catalytic bed with an electrical charge to separately collect bauxite compounds from the stack gas flow before passing through the first catalytic bed. This method of drying and cleaning stack gas may have the stack gas exiting a stack from the third catalytic bed with at least 70% or at least 90% reduction in bauxite compounds, carbon oxides, sulfur oxides, nitrogen oxides, and mercury oxide compared to the stack gas flow delivered to the stack.

This third alternative method of drying and cleaning stack may have at least two series of stack gas flows provided in parallel to pass the same or a different pair of electrodes positioned inline to ionize the water vapor in the stack gas without creating substantial amounts of hydrogen gas and through a first catalytic bed, a second catalytic bed, and a third catalytic bed so that one bed of stack gas flow can be dried and cleaned by the method described while another series of stack gas flow-through flow is purged.

This third alternative method of drying and cleaning stack gas may also comprise a fourth catalytic flow-through bed comprised of calcium zeolite of natural zeolite particles between 44 μm and 64 μm in size positioned in the stack gas flow after the pair of electrodes and before the first catalytic bed, with an electrical charge on said fourth catalytic flow-through bed, to separately collect bauxite compounds from the stack gas flow before passing through the first catalytic bed. In this alternative method of drying and cleaning stack gas, the stack gas exiting a stack from the third catalytic bed may have at least 70% or at least 90% reduction in bauxite compounds, sulfur oxides, nitrogen oxides, mercury oxide, and carbon oxides compared to the stack gas flow delivered through the stack.

The method and alternative methods of drying and cleaning stack gas may comprise the additional step of passing the gas flow through a venturi positioned downstream of the third catalytic flow-through bed to stabilize the gas flow through the catalytic flow-through beds.

The method and alternative methods of drying and cleaning stack gas may have the stack gas flow sequentially circulated past the pair of electrodes and through the first catalytic flow-through bed, the second catalytic flow-through bed, and the third catalytic flow-through bed to also remove at least 50% or at least 70% of mercury in all forms from the gas flow.

Also disclosed is a fertilizer product produced by the steps of:
(a) passing a stack gas flow selected from the group consisting of volatiles from combustion of coal or from combustion of natural gas or from a cement kiln by a pair of electrodes positioned generally inline in the gas flow with D.C. voltage applied between the electrodes to ionize water vapor, without creating substantial amounts of hydrogen gas, and reduce moisture content of the gas flow below, for example, 8% or 5% of moisture content in the gas flow,
(b) passing the gas flow from the pair of electrode through a first catalytic flow-through bed comprised of calcium zeolite of natural zeolite particles of a majority between 44 μm and 64 μm in size, at a temperature above the dew point between 125° F. and 500° F. and a pressure between 3 psi and 200 psi, adapted to reduce carbon oxides in the stack gases;
(c) passing the gas flow from the first catalytic flow-through bed through a second catalytic flow-through bed comprised of a blend between 25 and 75% of sodium zeolite and calcium zeolite of natural sodium and calcium zeolite particles of a majority between 65 μm and 125 μm in size, at a temperature above the dew point between 125° F. and 500° F. and a pressure between 3 psi and 200 psi, adapted to reduce sulfur oxides in the stack gas flow;
(d) passing the gas flow from the second catalytic flow-through bed through a third catalytic flow-through bed comprised of calcium zeolite of natural zeolite particles of a majority between 78 μm and 204 μm, at a temperature above the dew point between 125° F. and 500° F. and a pressure between 3 psi and 200 psi, to reduce nitrogen oxides in the stack gas flow and providing gas exiting the third catalytic bed with at least 70% reduction in carbon oxides, sulfur oxides, and nitrogen oxides; and
(e) purging residuals from the first catalytic bed, the second catalytic bed, and the third catalytic bed by intermittently passing nitrogen through the beds to remove residuals collected from the stack gases by the beds.

Also disclosed is fertilizer product produced by the steps of:
(a) passing a stack gas flow of less than 7% oxygen selected from the group consisting of volatiles from combustion of coal or from combustion of natural gas or from a cement kiln by a pair of electrodes adapted to be positioned generally inline in the gas flow with a voltage applied to the electrodes to ionize water vapor in the gas flow without creating substantial amounts of hydrogen gas and reduce moisture content of the gas flow, for example, below at least 8%,
(b) passing the gas flow from the electrodes through a first catalytic flow-through bed comprised of calcium zeolite of natural zeolite particles at a temperature above the dew point between 125° F. and 500° F. and a pressure between 3 psi and 200 psi adapted to reduce carbon oxides from the stack gases and increase oxygen levels in the stack gas;
(c) passing the gas flow from the first catalytic flow-through bed through a second catalytic flow-through bed comprised of a blend between 25% and 75% of sodium zeolite and calcium zeolite of natural sodium and calcium zeolite particles of at a temperature above the dew point between 125° F. and 500° F. and a pressure between 3 psi and 200 psi adapted to reduce sulfur oxides from the stack gases and increase oxygen levels in the stack gas; and
(d) passing the gas flow from the second catalytic flow-through bed through a third catalytic flow-through bed comprised of calcium zeolite of natural zeolite particles at a temperature above the dew point between 125° F. and 500° F. and a pressure between 3 psi and 200 psi adapted to reduce nitrogen oxides in the stack gases and increase oxygen levels in the stack gas flow; and providing gas flow exiting the third catalytic bed with at least 70% reduction in sulfur oxides, nitrogen oxides and carbon oxides and greater than 15% oxygen.

Also disclosed is fertilizer product produced by the steps of:
(a) passing a stack gas flow from the group consisting of volatiles from combustion of coal or from combustion of natural gas or from a cement kiln by a pair of electrodes positioned generally inline in the gas flow and applying a D.C. voltage to ionize water vapor without creating substantial amounts of hydrogen gas and reduce moisture content of the gas flow through the catalytic flow-through beds,
(b) passing the gas flow from the pair of electrodes though a first catalytic flow-through bed comprised of natural calcium zeolite with a porosity of a total surface area of not greater than 1200 m$^2$/g adapted to reduce carbon oxides in the stack gas;
(c) passing the gas flow from the first catalytic flow-through bed through a second catalytic flow-through bed comprised of a blend of natural sodium zeolite and natural calcium zeolite with a porosity of a total surface area of not greater than 1200 m$^2$/g adapted to reduce sulfur oxides in the stack gas with the blend of sodium zeolite and calcium zeolite between 25% and 75%;
(d) passing the gas flow from second catalytic flow-through bed through third catalytic flow-through bed comprised of natural calcium zeolite with a porosity of a total surface area not greater than 1200 m$^2$/g adapted to reduce nitrogen oxides in the stack gas and providing gas exiting the third catalytic bed with at least 70% reduction in sulfur oxides, nitrogen oxides, and carbon oxides; and
(e) purging residuals collected from the first catalytic bed, the second catalytic bed, and the third catalytic bed and collecting said residuals purged from the first catalytic bed, the second catalytic bed, and the third catalytic bed to provide a fertilizer product.

Also disclosed is a method of reducing moisture content in a gas flow comprising the steps of:
(a) positioning generally inline a pair of electrodes in a gas flow with moisture content to be reduced to ionize water vapor in the gas flow without creating substantial amounts of hydrogen gas;
(b) providing insulating containment of the gas flow, such as a pipe, from the electrodes; and
(c) applying voltage between the electrodes to ionize water vapor in the gas flow to reduce moisture content of the gas flow to at least 8% without creating substantial amounts of hydrogen gas.

In the various embodiments of the method, apparatus or fertilizer product, carbon monoxide (CO), carbon dioxide ($CO_2$), nitrogen oxide ($NO_X$), sulfur dioxide ($SO_2$) and nitrogen dioxide ($NO_2$) in the gas stack flow may be reduced. The solid waste may also include nitrate salt formed by reaction of nitrogen and nitrogen compounds retained in the zeolite beds with available oxygen. Exit from the third catalytic bed may typically include excess oxygen from the reduction according in the first, second and third catalytic flow-through beds as described above. The apparatus may also include a product purged with liquid nitrogen.

In any case, the exiting stack gas with increased oxygen levels may be returned from the gas cleaning system to the burner where it is combusted with the coal or natural gas. The system may also include a solid waste draw for collecting the materials and drawing the waste material away from the gas cleaning section.

Other details, objects and advantages of the present invention will become apparent from the description of the preferred embodiments described below in reference to the accompanying drawings.

BRIEF DESCRIPTION OF THE DRAWINGS

The invention in various aspects is described in the following description and the accompanying drawings which include.

DETAILED DESCRIPTION OF THE DRAWINGS

Figure 1:
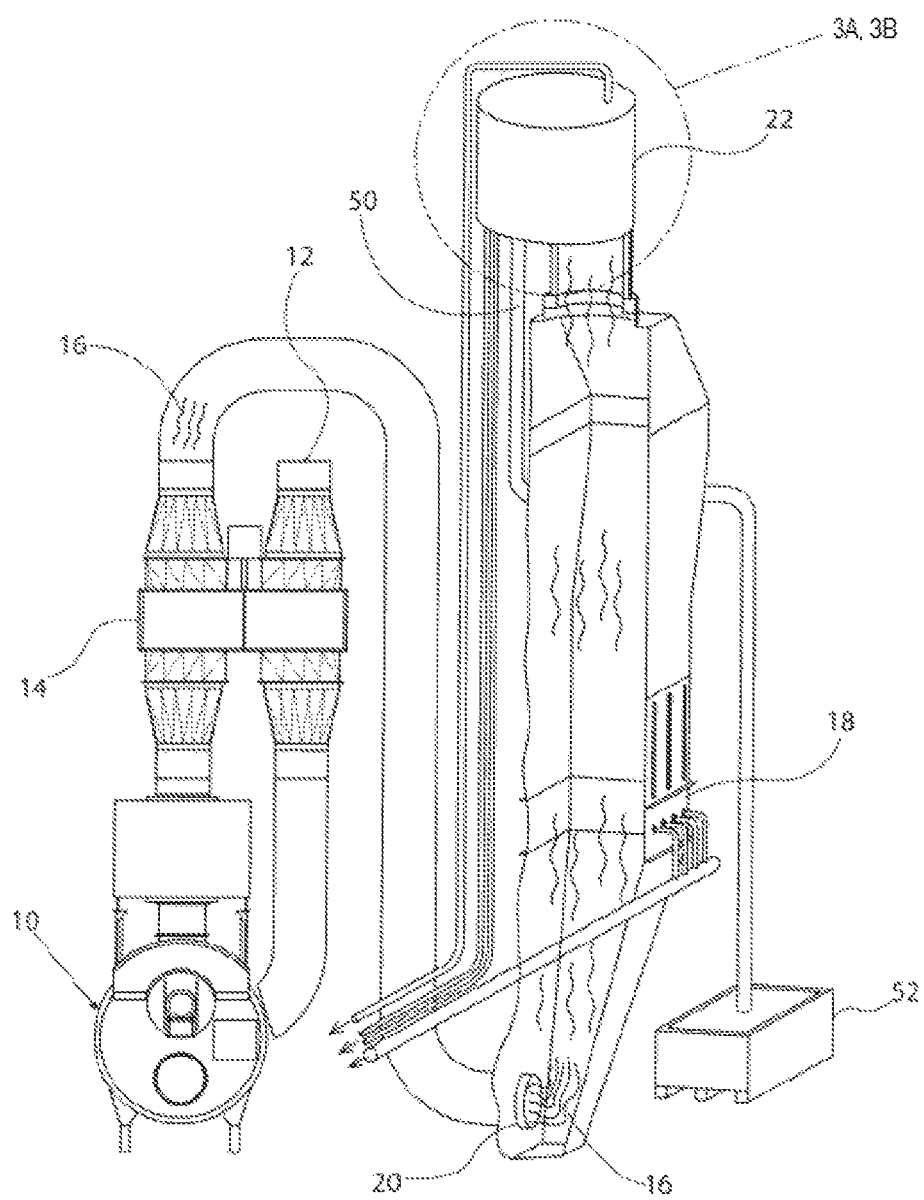
FIG. 1 is a schematic illustrating a coal-fired boiler for electric power generation using stack gases that are cleaned and solid/liquid products recovered in accordance with the present invention.

FIG. 1 is a schematic illustrating a coal-fired boiler for electric power generation producing stack gases that are cleaned and solid/liquid products recovered. A coal fired boiler 10 is shown utilizing the stack gas cleaning and recovery apparatus and method of the present invention. Fresh air intake 12 flows through preheater 14 to supply preheated fresh air to the boiler 10 that is coal fired. The stack gases 16 from boiler 10 pass through preheater 14 whereby heat is transferred to the fresh air intake 12.

The stack gases 16, now processed by preheater 14, are conveyed to an emission control unit where the stack gases 16 are circulated to emission control system 18 through inlet 20 and allowed to rise through the emission control system 18 and up through gas cleaning apparatus 22. The stack gases 16 at this point typically include carbon monoxide, carbon dioxide, sulfur oxides and nitrogen oxides. The stack gases 16 also include water vapor and particulates such as aluminum oxides, mercury compounds and other particulate matters such as uranium and rare earth metals as well as halogens such as fluoride and chloride.

Figure 2A:
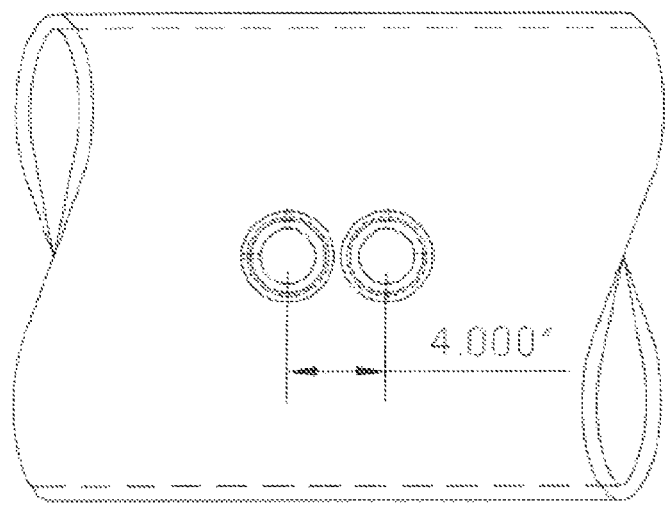
FIGS. 2A, 2B, and 2C fragment parts of the piping for the stack gas cleaning and recovery system shown in FIG. 1 upstream of the portion shown in FIG. 3A or FIG. 3B.
Figure 2B:
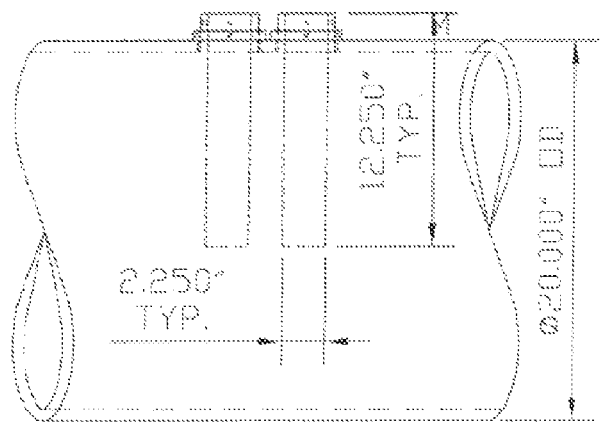
Figure 2C:
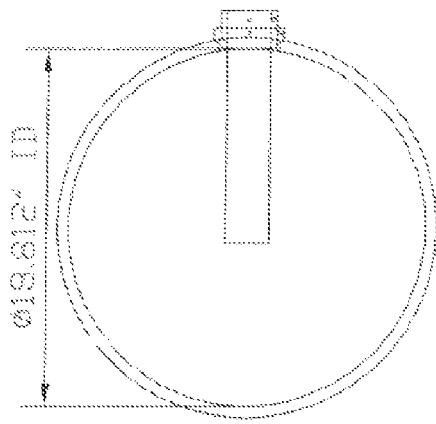

With reference to FIGS. 2A, 2B and 2C is shown a part of the piping 21 for the stack gas cleaning apparatus 22 shown in FIG. 1 upstream of the portion shown in FIG. 3A or FIG. 3B as described further below. A pair of electrodes 23A and 23B, each preferably commercially available graphite rods, are placed in line piping 21 in the stack gas 16 and are of dimensions that extend into piping 22A sufficient to efficiently ionize the stack gas 16 flowing past the electrodes 23A and 23B. Electrodes 23A and 23B are insulated at 21A from piping 21 to efficiently provide for ionization of stack gas 16. A D.C. voltage, at between about 1 and 18.8 volts, is applied between the electrodes 23A and 23B sufficient to form the various ions of $H_2O$ such as HO+, $H_2O+$, H+, O+ and $O_2+$, while avoiding formation of substantial amounts of $H_2$ which is produced at higher voltages (e.g., about 34 volts). See "The Ionization of Water Vapor by Electron Impact" Physical Review Vol 43, 116 et seq. (January 1933) The voltage may vary with varying sizes of piping 21 and varying flow rates of stack gas 16. For increases in efficiency of ionization, electrodes 23A and 23B can be increased in size to provide for greater surface area and more than one pair of electrodes in the stack gas flow can be employed. The desire is to provide sufficient ionization to reduce the moisture content of the stack gas 16 flowing through the catalytic flow-through beds 24, 26 and 28, or the catalytic flow-through beds 30, 24, 26 and 28, to below, for example, 8%, or 5% or 3%, as desired to provide for efficient operation of the catalytic flow-through beds in cleaning the stack gas 16 as described below.

Figure 3A:
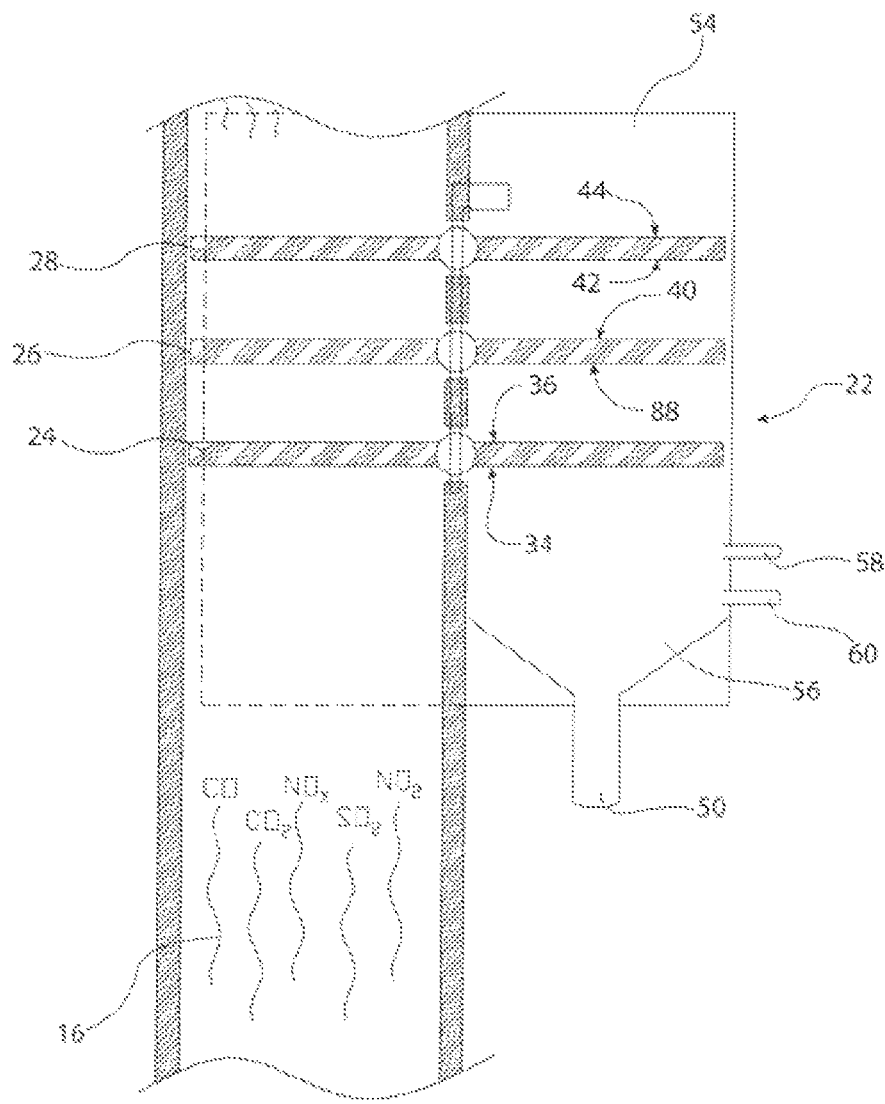
FIG. 3A is an enlarged portion of part of the stack gas cleaning and recovery system shown in FIG. 1 in which three catalytic flow beds are utilized.
Figure 3B:
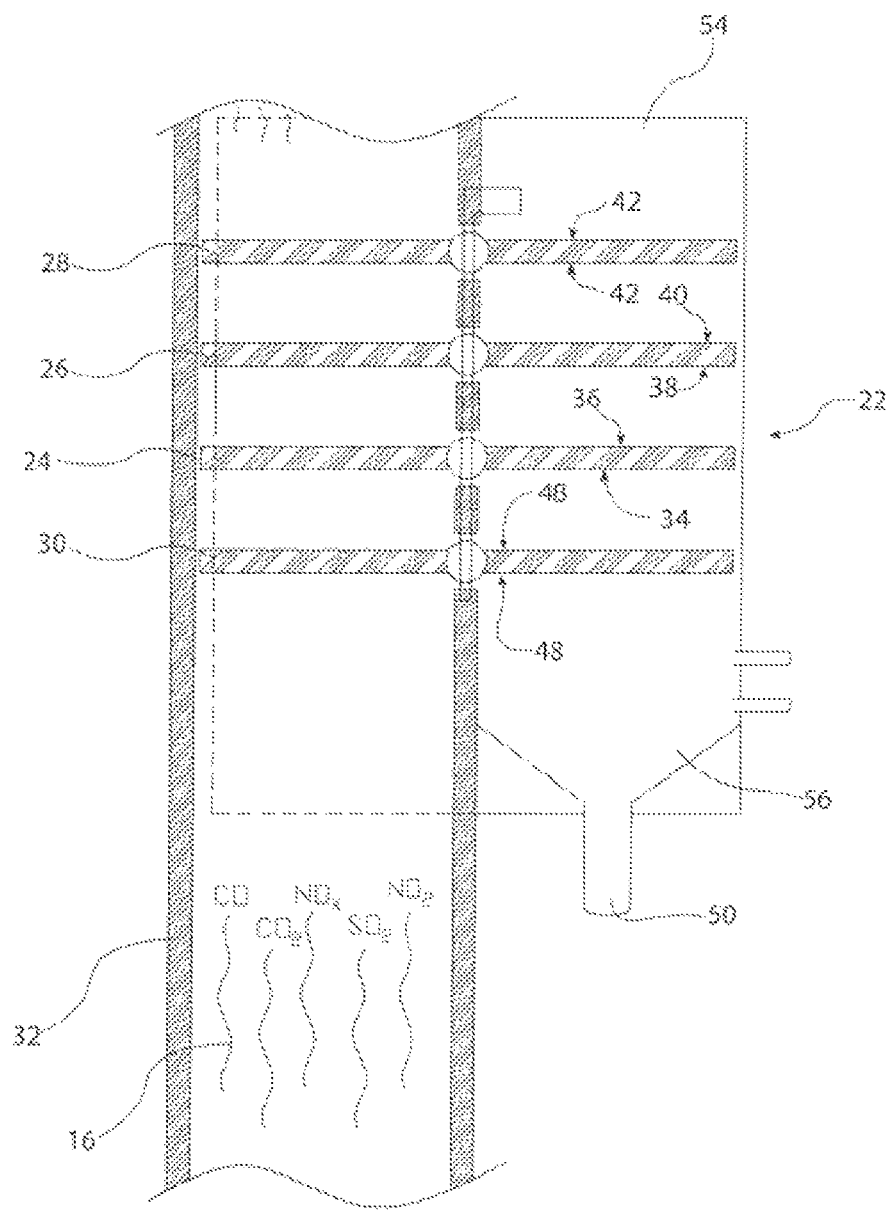
FIG. 3B is an enlarged portion of part of the stack gas cleaning and recovery shown in FIG. 1 in which four catalytic beds are utilized.

With reference to FIGS. 3A-3B, gas cleaning apparatus 22 further comprises first catalytic flow-through bed 24, second catalytic bed 26 and third catalytic flow-through bed 28 as shown in FIG. 3A, or through fourth catalytic flow-through bed 30, first catalytic flow-through bed 24, second catalytic flow-through bed 26, and third catalytic flow-through bed 28 as shown in FIG. 3B. In FIG. 3A, the rising stack gases 16 in cleaning apparatus 22 first flow through the first catalytic flow-through bed 24, followed by the adjacent second catalytic flow-through bed 26, and then followed by the third catalytic flow-through bed 28. When fourth catalytic flow-through bed 30 is utilized as shown in FIG. 3B, fourth catalytic flow-through bed 30 in stack 32 in gas stack 16 may be positioned after the pair of electrodes 23A and 23B and before the first catalytic flow-through bed 24.

First catalytic flow through bed 24 is comprised of calcium zeolite of natural zeolite particles with a majority between 44 μm and 64 μm in size. "Majority" in the particle size range means here, as well as throughout this application, that it necessarily is 50% or more of the particle sizes in the particle size increment of zeolite to efficiently achieve reduction of carbon oxides in the stack gas. The calcium zeolite is a calcium-sodium-potassium aluminosilicate that is relative high calcium oxide that is available from a natural source. Typical chemical analyses of such calcium zeolite are (i) 2.85% calcium oxide (CaO), 2.85% potassium oxide ($K_2O$), 0.98% manganese oxide (MgO), 0.06% manganese oxide (MnO), 0.19% titanium dioxide ($TiO_2$), 0.05% potassium oxide ($P_2O_5$), 0.03% sodium oxide ($Na_2O$), 11.43% aluminum oxide ($Al_2O_3$), 1.26% ferric oxide ($Fe_2O_3$) 66.35% silicon dioxide ($SiO_2$) and 13.28% LOI; and (ii) 3.4% calcium oxide (CaO), 3.0% potassium oxide ($K_2O$), 1.5% manganese oxide (MgO), 0.05% potassium oxide ($P_2O_5$), 0.3% sodium oxide ($Na_2O$), 12.1% aluminum oxide ($Al_2O_3$), 1.6% ferric oxide ($Fe_2O_3$), 70.0% silicon dioxide ($SiO_2$). A source for calcium zeolite, amongst others, is St. Cloud Mining Company mines at Winston and Truth or Consequences, New Mexico 87901, or a similar mine available in other parts of the world. "Natural zeolite" means here, and elsewhere in this description, zeolite that is mined as opposed to artificially created.

The depth and breadth of the first bed 24 is determined by the flow rate of the stack gases 16 and desired pressure drop, and the physical dimensions of the stack 32 through which stack gases 16 are flowing through the gas cleaning apparatus 22. First catalytic flow-through bed 24 is provided as a flow-through bed held in position by lower screen 34 and upper screen 36 each of between 150 and 250 mesh designed to hold the bed of calcium zeolite in position while allowing flow through of the stack gases 16.

The primary function of first catalytic flow-through bed 24 is splitting carbon monoxide and carbon dioxide, and retaining carbon in various forms and compounds in the zeolite bed. First catalytic flow-through bed 24 also captures ash and other particular matter not previously captured, as well as bauxite compound if the fourth catalytic flow-through bed 30 is not provided as shown in FIG. 3A.

The stack gases 16 in cleaning apparatus 22 then flow through second catalytic flow-through bed 26 positioned downstream of the first catalytic flow-through bed 24. Second catalytic flow-through bed 26 is comprised of a blend between 25% and 75% of sodium zeolite and calcium zeolite with a majority being natural sodium and calcium zeolite particles between 65 μm and 125 μm in size available from a natural source. The source of the calcium zeolite can be the same as that used to provide first catalytic flow-through bed 24, but comprised of a majority of a particle size between 65 μm and 125 μm. The sodium zeolite may be natural sodium-potassium clinoptilolite that is relatively high in sodium oxide content. Typical chemical analyses of such sodium zeolite are (i) 3.5% sodium oxide ($Na_2O$), 3.8% potassium oxide ($K_2O$), 11.9% aluminum oxide ($Al_2O_3$), 0.7% ferric oxide ($Fe_2O_3$), 0.8% calcium oxide (CaO), 0.4% manganese oxide (MgO), 0.02% manganese oxide (MnO), 0.1% titanium oxide ($TiO_2$) and 69.1% silicon dioxide ($SiO_2$); and (ii) 3.03% sodium oxide ($Na_2O$), 3.59% potassium oxide ($K_2O$), 10.27% aluminum oxide ($Al_2O_3$), 0.86% ferric oxide ($Fe_2O_3$), 1.77% calcium oxide (CaO), 0.00% potassium oxide ($K_2O$), 0.4% manganese oxide (MgO), 0.02% manganese oxide (MnO), 0.11% titanium oxide ($TiO_2$), 69.1% silicon dioxide ($SiO_2$), and 13.09% LOI. A source of the sodium zeolite, amongst others, is the St. Cloud mines in Ash Meadows, Nev., or a similar zeolite mine in another part of the world. Again, the size and depth of the second set of the flow-through bed is determined by the physical dimensions of the stack 32 and the flow rate and pressure drop through the stack 32 at the gas cleaning apparatus 22.

The primary purpose of the second catalytic flow-through bed 26 is to capture and split sulfur oxides ($SO_X$) in the stack gas 16. The second catalytic flow-through bed 26 is also effective in reducing metal compounds such as mercury, lead, uranium and other trace materials. Again, a lower screen 38 and an upper screen 40 may be provided with mesh sizes between 150 and 250 mesh to maintain the second catalytic flow-through bed 28 while allowing appropriate flow through of stack gas 16.

On exiting the second catalytic flow-through bed 26, the stack gases 16 flow downstream through third catalytic flow-through bed 28. The third catalytic flow-through bed is comprised of calcium zeolite similar in chemical analysis to the first catalytic flow-through bed 24 but with a majority of natural zeolite in the particle size for this bed between 78 μm and 204 μm.

The third catalytic flow-through bed 28 is provided primarily to split nitrogen oxides present in the stack gas 16. The third catalytic flow-through bed may also reduce other pollutant compounds and ash in the stack gas 16. The composition of natural calcium zeolite in third catalytic flow-through bed 28 may be comprised of the same composition as the first catalytic flow through bed 24, but with different zeolite particle sizes, as described herein, for efficient reduction of nitrogen oxides. Again, a lower screen 42 and an upper screen 44 with mesh size between 150 and 250 mesh is provided to maintain the third catalytic flow through bed 28.

Thus, disclosed FIG. 3A is a method of cleaning stack gases after the stack gas flow passes the pair of electrodes 23A and 23B comprising the steps of:

(a) providing a stack adapted to pass stack gases through a first catalytic flow-through bed 24 comprised of calcium zeolite of natural zeolite particles with a majority of zeolite between 44 μm and 64 μm in size, at a temperature above the dew point between 125° F. and 500° F. and a pressure between 3 psi and 200 psi, adapted to reduce carbon oxides from the stack gases;

(b) providing, in the stack adapted to pass stack gases and positioned downstream of the first catalytic flow-through bed 24, a second catalytic flow-through bed 26 comprised of a blend between 25 and 75% of natural sodium zeolite and natural calcium zeolite of zeolite particles with a majority zeolite between 65 μm and 125 μm in size, at a temperature above the dew point between 125° F. and 500° F. and a pressure between 3 psi and 200 psi, adapted to reduce sulfur oxides from the stack gases;

(c) providing, in the stack adapted to pass stack gases and positioned downstream of the second catalytic flow-through bed 26, a third catalytic flow-through bed 28 comprised of natural calcium zeolite of zeolite particles with a majority of zeolite between 78 μm and 204 μm, at a temperature above the dew point between 125° F. and 500° F. and a pressure between 3 psi and 200 psi, adapted to reduce nitrogen oxides in the stack gases; and (d) passing stack gases, selected from the group consisting of volatiles from combustion of coal or from combustion of natural gas or from a cement kiln, sequentially past the electrodes and through the first flow-through catalytic bed 24, the second flow-through catalytic bed 26, and the third flow-through catalytic bed 28, each flow-through catalytic bed collecting residuals in the catalytic beds and providing gas exiting the third catalytic bed with at least 70% reduction in carbon oxides, sulfur oxides, and nitrogen oxides.

The method may also sequentially circulate the stack gas flow past the same or a different pair of electrodes and through the first flow-through catalytic bed 24, the second flow-through catalytic bed 26, and the third flow-through catalytic bed 28 to remove from the stack gas at least 50% or 70% of mercury in all forms, namely, elemental and oxidized forms.

Alternatively disclosed in FIG. 3A is a method of drying and cleaning stack gases comprising the steps of:
- (a) providing a stack gas flow of less than 7% oxygen in containment past generally inline electrodes with a voltage applied to the electrodes to ionize water vapor in the stack gas flow and reduced moisture content in the stack gas flow,
- (b) providing in a stack adapted to pass stack gases of less than 7% oxygen passing the pair of electrodes through a first catalytic flow-through bed 24 comprised of natural calcium zeolite of natural zeolite particles at a temperature above the dew point between 125° F. and 500° F. and a pressure between 3 psi and 200 psi adapted to reduce carbon oxides from the stack gases and increase oxygen levels in the stack gases;
- (c) providing, in the stack adapted to pass stack gases and positioned downstream of the first catalytic flow-through bed 24, a second catalytic flow-through bed 26 comprised of a blend between 25 and 75% of sodium zeolite and calcium zeolite of natural zeolite particles at a temperature above the dew point between 125° F. and 500° F. and a pressure between 3 psi and 200 psi adapted to reduce sulfur oxides from the stack gas and increase oxygen levels in the stack gases;
- (d) providing, in the stack adapted to pass stack gas and positioned downstream of the second catalytic flow-through bed 26, a third catalytic flow-through bed 28 comprised of calcium zeolite of natural zeolite particles at a temperature above the dew point between 125° F. and 500° F. and a pressure between 3 psi and 200 psi adapted to reduce nitrogen oxides in the stack gases and increase oxygen levels in the stack gases; and
- (e) passing stack gases of less than 7% oxygen, selected from the group consisting of volatiles from combustion of coal or from combustion of natural gas or from a cement kiln, sequentially past the pair of electrodes and through the first catalytic bed 24, the second catalytic bed 26, and the third catalytic bed 28 collecting residuals in the catalytic beds and providing gas exiting the third catalytic bed with at least 70% reduction in sulfur oxides, nitrogen oxides and carbon oxide and greater than 15% oxygen content.

The invention is operative as evidenced by substantial increase in oxygen exiting the third catalytic bed 28 compared to the oxygen levels in the stack gas entering the first catalytic bed 24. The paper by Yoshitaka Toda et al. titled "*Activation And Splitting of Carbon Dioxide on The Surface Of An Inorganic Electrode Material*" (Published 31 Jul. 2013) suggests a potential mechanism, namely, splitting off oxygen from $CO_2$ leaving CO to be then reduced. One mechanism to accomplish $CO_2$ splitting is electrophoresis disassociation of oxygen in the presence of the zeolite catalyst bed into various forms of carbon and oxygen, including oxygen radicals such as the superoxide $O_2-$ anion. Metal clusters formed in the process in the presence of the zeolite catalyst may also provide additional catalytic activity resulting in $CO_2$ splitting.

Also, the nitrogen from the stack gas is in large part retained in the zeolite beds, and is available for reaction with available oxygen present particularly during purging as described below.

Where a fourth catalytic flow through bed 30 is provided as shown in FIG. 3B, the fourth catalytic flow-through bed is provided in the stack gas 16 after passing the pair of electrodes and before the first catalytic flow-through bed 24. The gas stream 16 may flow through the fourth catalytic-flow-through bed 30 before flowing into the first catalytic flow-through bed 24. The composition of the fourth catalytic flow-through bed 30 is comprised of the same composition as the first catalytic flow-through bed, namely, comprised of calcium zeolite, but with a majority of the natural zeolite being particles between 44 μm and 64 μm in size. The fourth catalytic flow-through bed is maintained in position by lower screen 46 and upper screen 48 with a mesh size between 150 and 250 mesh while allowing flow of stack gas 16 though the bed. An electrical charge is also provided on the lower screen 46 to provide that the fourth catalytic flow-through bed 30 attracts and retains bauxite particles from stack gas 16. As a result the fourth catalytic flow-through bed 30 comprised of calcium zeolite of natural zeolite particles between 44 μm and 64 μm in size positioned in the stack before the first catalytic bed 24 with an electrical charge beneath said fourth catalytic flow-through bed 30 to efficiently collect bauxite compounds from the stack gases before passing through the first catalytic bed.

Where the fourth catalytic flow-through catalytic bed 30 is provided as shown in FIG. 3B, aluminum oxide may be largely separately collected and separately processed to be recovered, as explained further herein. The stack gas 16 flowing through gas cleaning apparatus 22 is separately cleaned of bauxite compounds as well as cleaned as described above of carbon dioxide, carbon monoxide, nitrogen oxides, sulfur oxides as well as mercury oxides, water vapor and other trace metals in the stack gas 16. The cleaning of the stack gases 16 flowing through first catalytic flow-through bed 24, second catalytic flow-through bed 26, third catalytic flow-through bed 28, and if present also fourth catalytic flow-through bed 30, provides at least 90%, 95%, or even 99% reduction in bauxite compounds, carbon oxides, sulfur oxides, nitrogen oxides, and mercury oxides from the stack gases 16.

Alternatively, a method of drying and cleaning stack gases may involve putting all of the zeolite beds in to all three or four of the catalytic flow-through beds. Therefore the method may comprising the steps of:
- (a) passing a contained stack gas flow, selected from the group consisting of volatiles from combustion of coal or from combustion of natural gas or from a cement kiln, past a pair of electrodes positioned generally inline in the gas flow and applying D.C. voltage between the electrodes to ionize water vapor without creating substantial amounts of hydrogen gas and reduce moisture content of the gas flow through the catalytic flow-through beds;
- (b) passing stack gas flow from the pair of electrodes through a catalytic flow-through bed comprised of a mixture of calcium zeolite of natural zeolite particles of a majority between 44 μm and 64 μm in size, a blend between 25 and 75% of sodium zeolite and calcium zeolite of natural sodium and calcium zeolite particles of a majority between 65 μm and 125 μm in size, and calcium zeolite of natural zeolite particles of a majority between 78 μm and 204 μm at a temperature above the dew point between 125° F. and 500° F. and a pressure between 3 psi and 200 psi adapted to reduce carbon oxides in the stack gas flow, the mixture having a porosity of a total surface area not greater than 1200 $m^2/g$; and (c) operating the stack gas flow sequentially past the pair of electrodes and through the catalytic bed to provide at least 70% reduction in sulfur oxides, nitrogen oxides and carbon oxide.

Again, the size of the pair of electrodes may be varied to provide the surface area to the desired moisture content in the stack gas flow, depending on the desired moisture content desired in the stack gas, for processing to reduce the levels of carbon oxides, sulfur oxides and nitrogen oxides, and the flow through volume of stack gas to be processed.

Figure 8A:
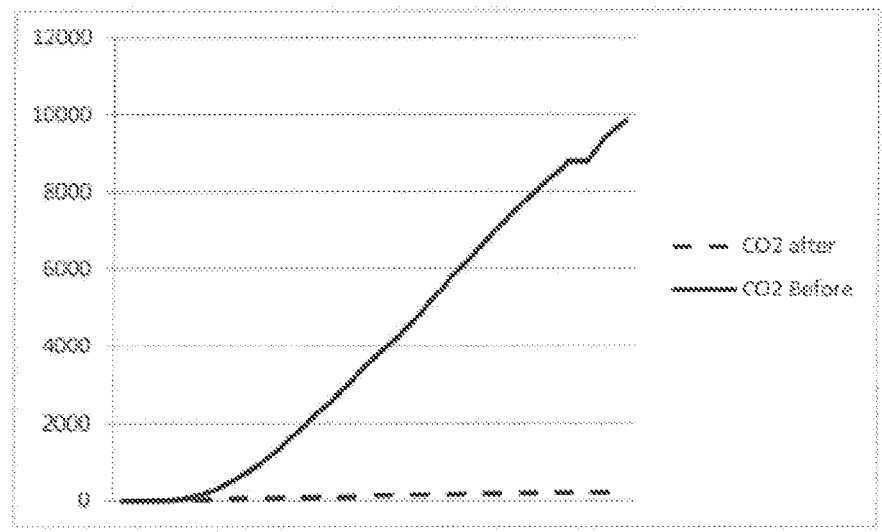
FIG. 8A is a graph illustrating $CO_2$ levels before and after clean.
Figure 8B:
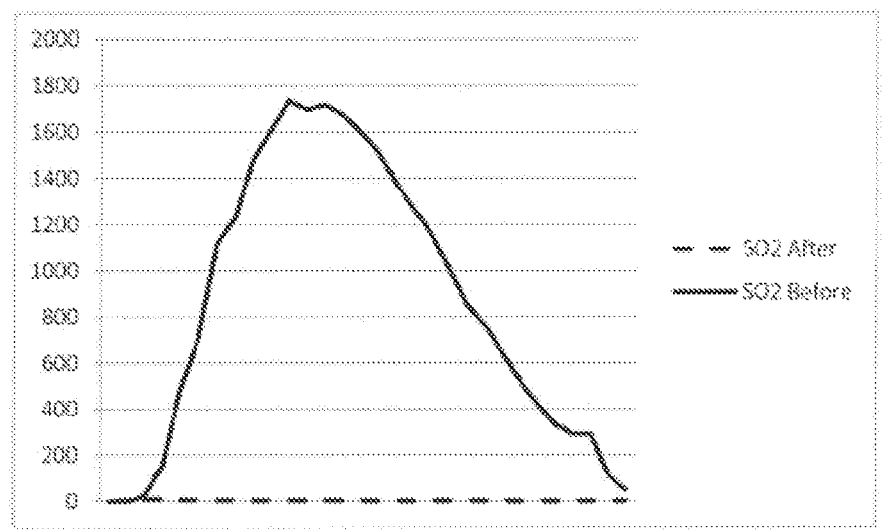
FIG. 8B is a graph illustrating $SO_2$ levels before and after cleaning.
Figure 8C:
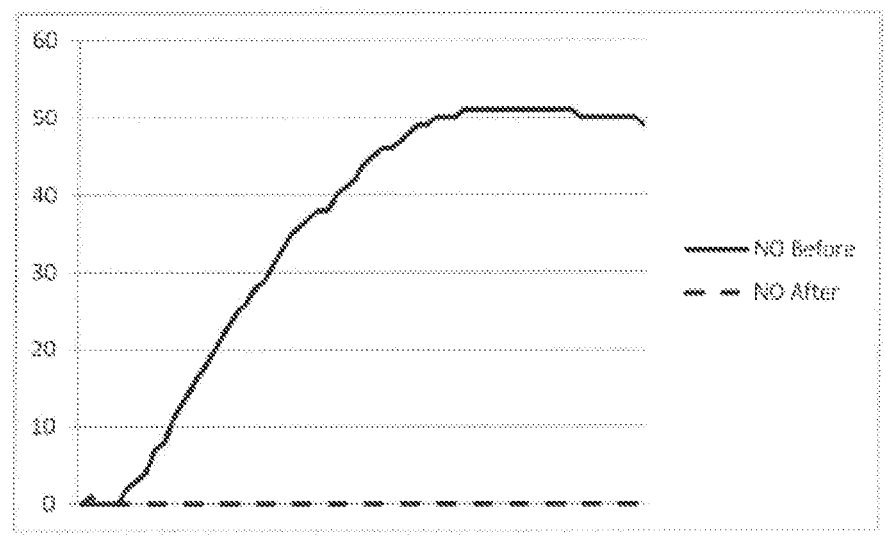
FIG. 8C is a graph illustrating NO levels before and after cleaning.

FIGS. 8A-8C represent data taken from a combustion gas emissions test where charcoal and 3 g of organic sulfur were combusted in a combustion oven. During a first test run, data was collected from the lower flue stack before the stack gas 16 passed through the stack gas cleaning apparatus 22. During a second test run, data was collected from the upper flue stack after the stack gas 16 passed through the gas cleaning apparatus. Data was collected every 5 seconds using a Testo 350XL portable combustion multi-gas analyzer. Data for the first test run (lower flue stack) was compared to and plotted with data for the second test run (upper flue stack) to provide an analysis of the results of the gas cleaning apparatus 22.

FIG. 8A illustrates measured levels of carbon dioxide ($CO_2$) (ppm) before (solid line) and after (dashed line) the stack gas 16 is cleaned by the cleaning apparatus 22.

FIG. 8B illustrates measured levels of sulfur dioxide ($SO_2$) (ppm) before (solid line) and after (dashed line) the stack gas 16 is cleaned by the cleaning apparatus 22.

FIG. 8C illustrates measured levels of nitrous oxide (NO) (ppm) before (solid line) and after (dashed line) the stack gas 16 is cleaned by the cleaning apparatus 22.

It was found by the comparison of the data that carbon dioxide in the stack gas 16 was reduced by at least 95% by the stack gas simulating from coal-fired plant entering cleaning apparatus 22; sulfur dioxide in the stack gas 16 was reduced by at least 95% from the simulated stack gas entering the cleaning apparatus 22; and nitrogen oxide in the stack gas 16 was split and reduced by 95% or more by the simulated stack gas entering cleaning apparatus 22. These results demonstrate the high effectiveness of the cleaning apparatus 22 in cleaning stack gas from a coal-fired power plant.

Figure 4:
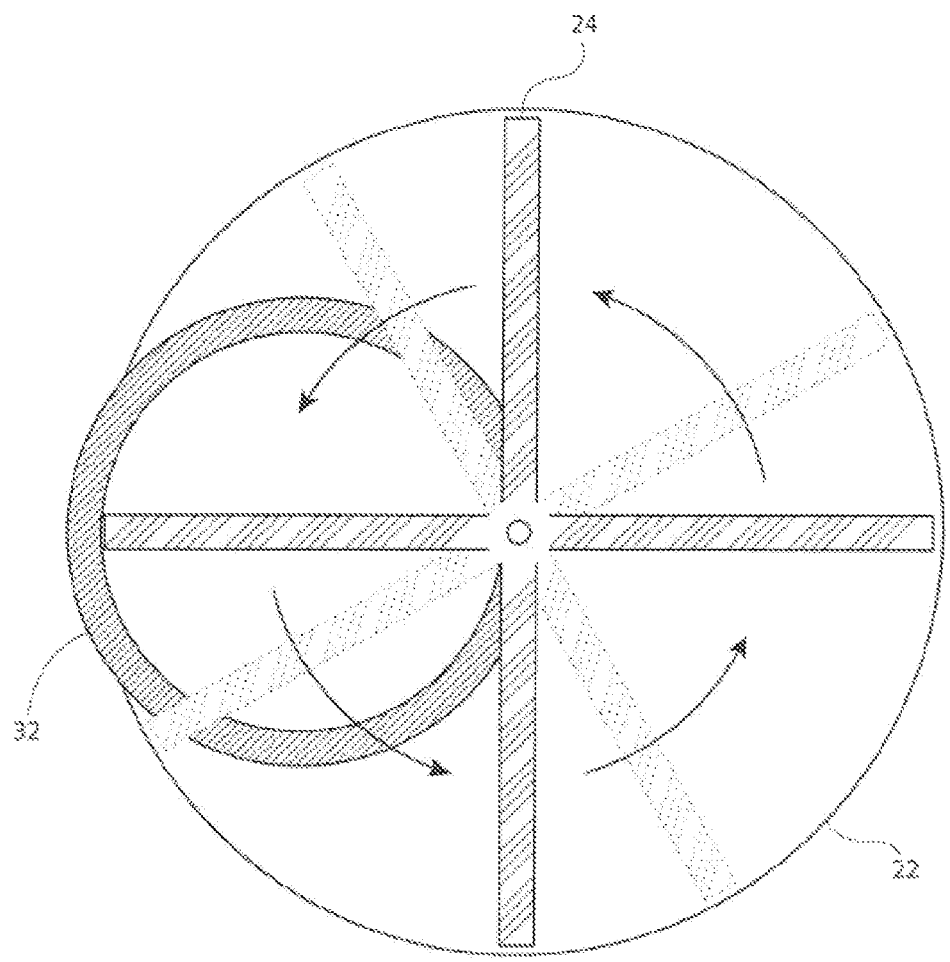
FIG. 4 is a cross-section taken along line 3-3 of FIG. 3A or FIG. 3B.

While the cleaning apparatus is in operation 22, residuals including carbon, sulfur, nitrogen, and other products are collected by the catalytic through-flow beds. Intermittently, as appropriate, the first catalytic through-flow bed 24, second catalytic through-flow bed 26, third catalytic through-flow bed 28 and fourth catalytic through-flow bed 30 (where present) may be switched between parallel systems as shown in FIGS. 3 and 4. The stack gases 16 may thus continue to flow through stack 32 and be cleaned in stack cleaning apparatus 22 while the parallel first catalytic through-flow bed 24, second catalytic through-flow bed 26, third catalytic through-flow bed 28 and fourth catalytic through-flow bed 30 (where present) are taken off-line and purged with nitrogen to remove material from the catalytic beds. This purging of the beds may be done with cryogenic nitrogen or nitrogen gas, generally available as a purge fluid.

During the purging process, purge fluid including nitrogen is released from a reservoir 54 and the purge fluid passes through one or more beds of the first catalytic through-flow bed 24, second catalytic through-flow bed 26, third catalytic through-flow bed 28 and/or fourth catalytic through-flow bed 30 (where present). The purge fluid may be pressurized or may fall by gravity through one or more of the catalytic through-flow beds, releasing material from the catalytic through-flow beds.

This purging produces residual waste largely of fertilizer composition that is discharged through outlet 50 into a container 52. The fertilizer compounds can be formed by reaction of the nitrogen and nitrogen compounds with the residuals retained by the zeolite beds with the oxygen present during purging. The mechanism of formation of these fertilizer materials may involve catalytic splitting of the carbon oxide, sulfur oxide and nitrogen oxide compounds present in the stack gas stream and retained by the zeolite beds, which are then available to react with free oxygen atoms and/or oxygen ions in purging with nitrogen. Because large amounts of nitrogen are present in the stack gas stream, relatively large amounts of nitrate compounds may be present in the fertilizers produced. In any case, these fertilizer compositions provide a valuable byproduct of the present process.

If a fourth catalytic through-flow bed 30 is provided, that bed may be separately purged through a separate outlet into a separate container (not shown) to allow for recovery of bauxite compounds as a separate product. Where a fourth catalytic bed 30 is not provided, the bauxite compounds are collected in the catalytic through-flow beds and provided as a part of a fertilizer composition. The metals such as mercury, zinc, lead and other trace metals are also collected known to be beneficial to compositions for soil collected as part of the fertilizer product that is recovered.

The purging may also produce gases, such as oxygen ($O_2$) and nitrogen ($N_2$) that may be extracted by a first gas outlet 58 that transports a portion of the gases (e.g. $N_2$) to a recycler and a second gas outlet 60 that transports a portion of the gases (e.g. $O_2$) to the burner for combusting the fuel, providing steam to drive the turbines in the power plant.

Figure 5:
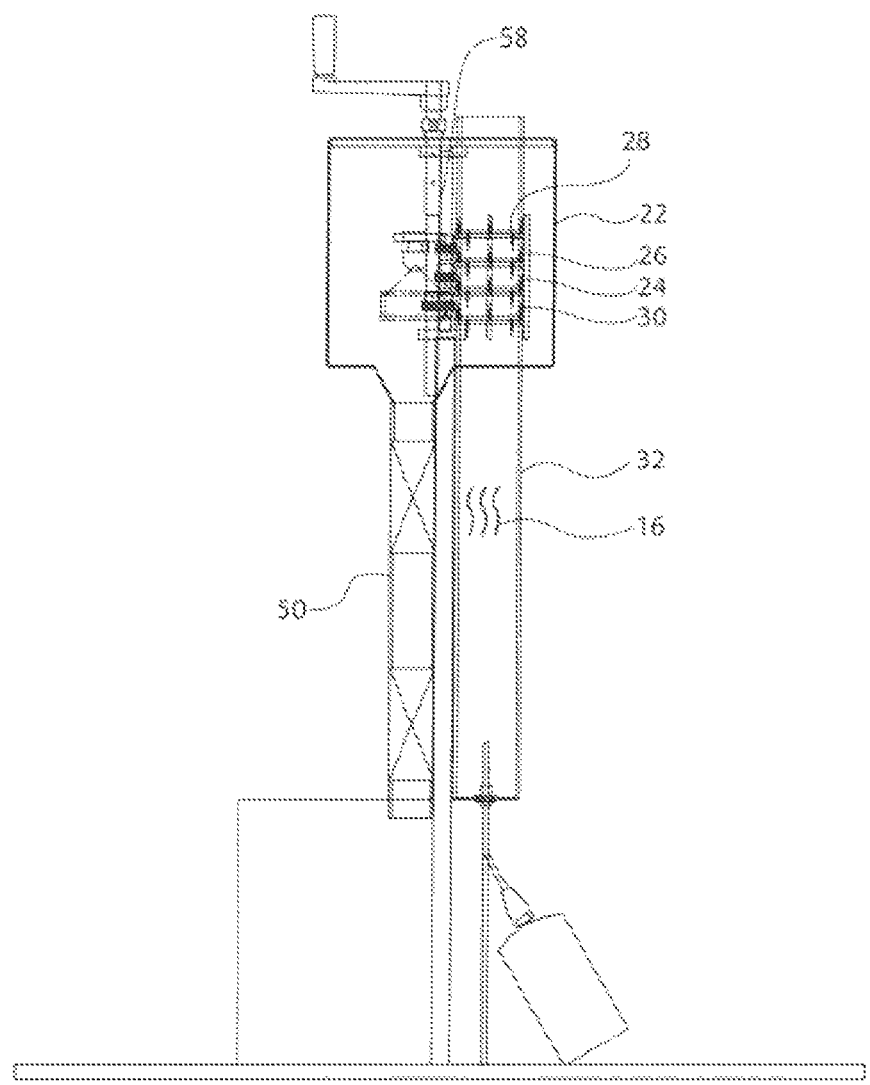
FIG. 5 is a schematic illustrating a test facility designed to test the cleaning of stack gases and recovery of solids and liquids in accordance with the invention.
Figure 6:
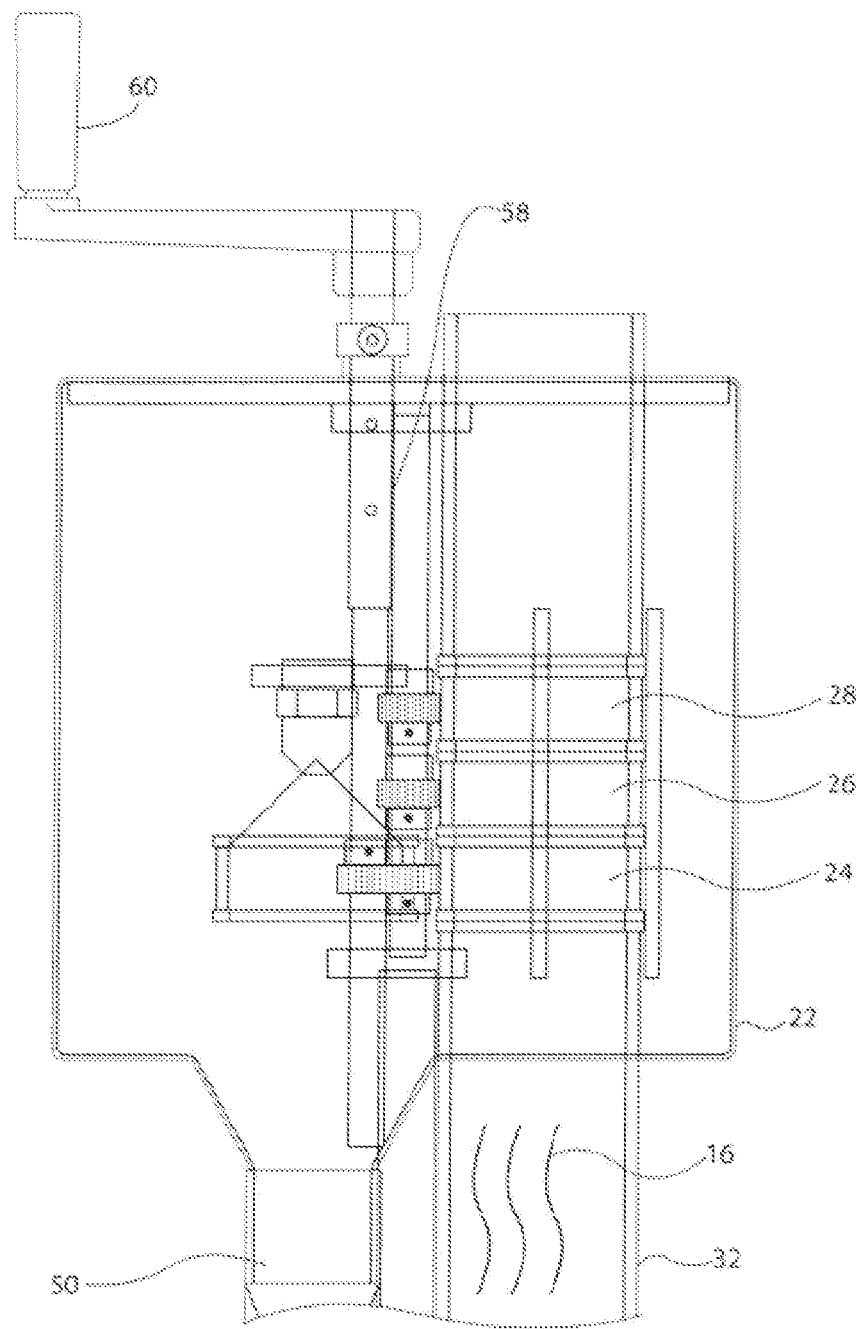
FIG. 6 is an enlarged portion of the test facility shown in FIG. 5.

A test apparatus is illustrated in FIGS. 5-6. The testing apparatus includes a stack 32 for transporting stack gas 16 to the gas cleaning apparatus 22 described above. The gas cleaning apparatus 22 is shown in further detail in FIG. 6 and includes first 24, second 26 and third 28 catalytic flow-through-beds each comprising a zeolite composition as described above. Each of the catalytic flow-through beds may be connected to a central drive shaft 58 that is adapted to rotate or otherwise move each of the catalytic flow-through beds, individually, from a first position where stack gas 16 passes through the bed to a second position where the catalytic flow-through bed is purged by the purge fluid. A handle 60 is provided that may be translated vertically to select one of the catalytic flow-through beds and rotated or otherwise move the selected flow-through bed from the first position to the second position.

Figure 7:
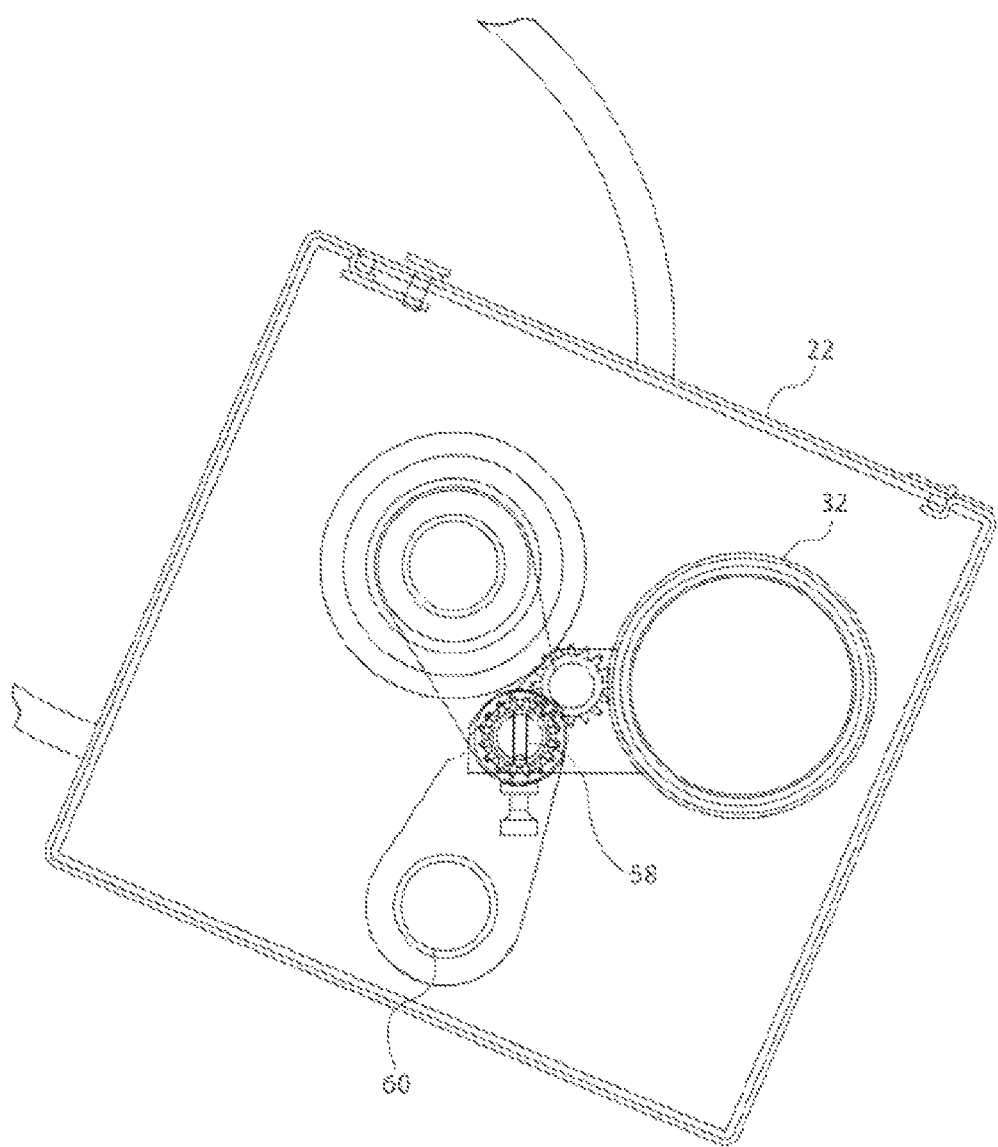
FIG. 7 is an illustration corresponding to FIG. 6 in top view showing the movement of catalytic flow through three catalytic beds of FIG. 6.

FIG. 7 is a top view of the cleaning apparatus 22 according to the testing apparatus shown in FIGS. 5-6. In this view, the compositions and particle size of catalytic through-flow beds are adjusted with the composition of the coal stack 32.

The tests with the test facility shown in FIGS. 5-7 included Kentucky co-fired by propane, Ohio coal fired and two tests with charcoal mixed with organic sulfur. The samples were fired by a propane burner at 62 shown in FIG. 5 or in a combustion oven (not shown) positioned upstream of stack 32. These illustrate the operation of the method and equipment. The data from these tests is set forth in table and graphic form in the Appendix to this application.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiments disclosed, but that the invention will include all embodiments falling within the scope of the appended claims.

What is claimed is:

1. Apparatus for drying and cleaning stack gases comprising:
   (a) a first catalytic flow-through bed comprised of natural calcium zeolite with a porosity of a total surface area of not greater than 1200 $m^2/g$ adapted to reduce carbon oxides present in an exhaust stack;
   (b) a second catalytic flow-through bed comprised of a blend of natural sodium zeolite and natural calcium zeolite of a porosity with a total surface area of not greater than 1200 $m^2/g$ adapted to reduce sulfur oxides present in the exhaust stack downstream of the first bed;
   (c) a third catalytic flow-through bed comprised of natural calcium zeolite with a porosity of a total surface area not greater than 1200 $m^2/g$ adapted to reduce nitrogen oxides present in the exhaust stack downstream of the second bed;
   (d) a pair of electrodes adapted to be positioned inline in the gas flow upstream of the first catalytic flow-through bed, the electrodes insulated from containment of the gas flow, with a DC voltage applied between the electrodes to ionize water vapor in the gas flow without creating substantial amounts of hydrogen gas and reduce moisture content of the gas flow through the catalytic flow-through beds;
   (e) the exhaust stack adapted to provide a gas flow, the gas flow selected from the group consisting of volatiles from combustion of coal or from combustion of natural gas or from a cement kiln, sequentially past the pair of electrodes and through the first catalytic flow-through bed, the second catalytic flow-through bed, and the third catalytic flow-through bed, each catalytic bed collecting residuals and providing stack gases exiting the third catalytic flow-through bed with at least 70% reduction in carbon oxides, sulfur oxides, and nitrogen oxides; and
   (f) wherein the first catalytic flow-through bed, the second catalytic flow-through bed, and the third catalytic flow-through bed are each adapted to be periodically purged with nitrogen such that residuals collected in the first catalytic flow-through bed, the second catalytic flow-through bed, and/or the third catalytic flow-through bed can be removed and each catalytic flow-through bed prepared for reuse.

2. The apparatus as set forth in claim 1 where the pair of electrodes in the gas flow upstream of the first catalytic flow-through bed are insulated from containment of the gas flow with the voltage applied between the electrodes of less than 34 volts to ionize water vapor in the gas flow and reduce moisture content of the gas flow in the first catalytic flow-through bed.

3. The apparatus as set forth in claim 1 where in addition a venturi is positioned in the gas flow downstream of the third catalytic flow-through bed to stabilize gas flow through the beds.

4. The apparatus as set forth in claim 1 where the pair of electrodes are positioned in the gas flow downstream of a baghouse.

5. The apparatus as set forth in claim 1 where the first catalytic flow-through bed, the second catalytic flow-through bed, and the third catalytic flow-through bed are each positioned between screens, the screens each between 150 and 250 mesh.

6. The apparatus as set forth in claim 1 where the second catalytic flow-through bed is comprised of the blend of natural sodium zeolite and natural calcium zeolite of between 25% and 75%.

7. The apparatus as set forth in claim 1 where the exhaust stack is adapted to exit gases from the third catalytic flow-through bed having at least 80% reduction in sulfur oxides, nitrogen oxides, and carbon oxides compared to the stack gases delivered to the pair of electrodes.

8. The apparatus as set forth in claim 1 where the exhaust stack is adapted to exit gases from the third catalytic flow-through bed having at least 90% reduction in carbon oxides, sulfur oxides, and nitrogen oxides compared to the stack gases delivered to the pair of electrodes.

9. The apparatus as set forth in claim 1 where the first catalytic flow-through bed, the second catalytic flow-through bed, and the third catalytic flow-through bed each have a porosity of a total surface area not greater than 800 $m^2/g$.

10. The apparatus as set forth in claim 1 further comprising at least two series of sequential gas flows through the same or different pair of electrodes, and different first catalytic flow-through bed, second catalytic flow-through bed, and third catalytic flow-through bed provided in parallel so stack gases can be cleaned through one of the series of beds while other series of beds can be purged.

11. The apparatus as set forth in claim 1 where a fourth catalytic flow-through bed of calcium zeolite is provided in the gas flow after the pair of electrodes and before the first catalytic flow-through bed with a porosity of a total surface area not greater than 1200 $m^2/g$ adapted to collect bauxite compounds before passage through the first catalytic flow-through bed.

12. The apparatus as set forth in claim 11 where the fourth catalytic flow-through bed is adapted to be periodically purged and refreshed with nitrogen.

13. The apparatus as set forth in claim 11 where the fourth catalytic flow-through bed has a porosity of a total surface area not greater than 800 $m^2/g$.

14. The apparatus as set forth in claim 11 where the exhaust stack is adapted to exit gases from the third catalytic flow-through bed with at least 70% reduction in bauxite compounds, carbon oxides, sulfur oxides, and nitrogen oxides compared to the stack gases delivered to the pair of electrodes.

15. The apparatus as set forth in claim 11 where the exhaust stack is adapted to exit gases from the third catalytic flow-through bed with at least 90% reduction in bauxite compounds, carbon oxides, sulfur oxides, and nitrogen oxides compared to the stack gases delivered to the pair of electrodes.

16. A method of drying and cleaning stack gases comprising the steps of:
   (a) passing a contained stack gas flow, the stack gas flow selected from the group consisting of volatiles from combustion of coal or from combustion of natural gas or from a cement kiln, through a pair of electrodes positioned generally inline in the gas flow and applying D.C. voltage between the electrodes to ionize water vapor in the gas flow without creating substantial amounts of hydrogen gas and reduce moisture content of the gas flow in the catalytic flow-through beds;

(b) passing stack gas flow from the electrodes through a first catalytic flow-through bed comprised of calcium zeolite of natural zeolite particles of a majority between 44 μm and 64 μm in size at a temperature above the dew point between 125° F. and 500° F. and a pressure between 3 psi and 200 psi adapted to reduce carbon oxides in the stack gas flow;

(c) passing the stack gas flow from the first catalytic flow-through bed through a second catalytic flow-through bed comprised of a blend between 25 and 75% of sodium zeolite and calcium zeolite of natural sodium and calcium zeolite particles of a majority between 65 μm and 125 μm in size at a temperature above the dew point between 125° F. and 500° F. and a pressure between 3 psi and 200 psi adapted to reduce sulfur oxides in the stack gas flow;

(d) passing the stack gas flow from the second catalytic flow-through bed through a third catalytic flow-through bed comprised of calcium zeolite of natural zeolite particles of a majority between 78 μm and 204 μm at a temperature above the dew point between 125° F. and 500° F. and a pressure between 3 psi and 200 psi adapted to reduce nitrogen oxides in the stack gas flow; and (e) operating the stack gas flow sequentially past the pair of electrodes and through the first catalytic bed, the second catalytic bed, and the third catalytic bed to provide at least 70% reduction in carbon oxides, sulfur oxides, and nitrogen oxides.

17. The method of drying and cleaning stack gas as claimed in claim 16 where the electrodes in the gas flow upstream of the first catalytic flow-through bed are insulated from containment of the gas flow with voltage applied between the pair of electrodes to ionize water vapor in the gas flow without creating substantial amounts of hydrogen gas and reduce moisture content of the gas flow through the catalytic flow-through beds.

18. The method of drying and cleaning stack gas as claimed in claim 16 comprising the additional step of passing the gas flow through a venturi positioned downstream of the third catalytic flow-through bed to stabilize the gas flow through the beds.

19. The method of drying and cleaning stack gas as claimed in claim 16 where the electrodes in step (a) are positioned in the gas flow downstream of a baghouse.

20. The method of drying and cleaning stack gas as claimed in claim 16 where the gas flow sequentially circulated past the pair of electrodes and through the first catalytic flow-through bed, the second catalytic flow-through bed, and the third catalytic flow-through bed also removes from the gas flow at least 50% of mercury in all forms.

21. The method of drying and cleaning stack gas as claimed in claim 16 where the gas flow sequentially circulated past the pair of electrodes and through the first catalytic flow-through bed, the second catalytic flow-through bed, and the third catalytic flow-through bed also removes from the gas flow at least 70% of mercury in all forms.

22. A method of drying and cleaning stack gases comprising the steps of:

(a) passing a contained stack gas flow selected from the group consisting of volatiles from combustion of coal or from combustion of natural gas or from a cement kiln by a pair of electrodes positioned generally inline in the gas flow and applying a D.C. voltage between the electrodes to ionize water vapor in the gas flow without creating substantial amounts of hydrogen gas and reduce moisture content of the gas flow through the catalytic flow-through beds;

(b) passing stack gas flow from the pair of electrodes through a first catalytic flow-through bed comprised of calcium zeolite of natural zeolite particles of a majority between 44 μm and 64 μm in size at a temperature above the dew point between 125° F. and 500° F. and a pressure between 3 psi and 200 psi adapted to reduce carbon oxides in the stack gases;

(c) passing the stack gas flow from the first catalytic flow-through bed through a second catalytic flow-through bed comprised of a blend between 25 and 75% of sodium zeolite and calcium zeolite of natural sodium and calcium zeolite particles of a majority between 65 μm and 125 μm in size at a temperature above the dew point between 125° F. and 500° F. and a pressure between 3 psi and 200 psi adapted to reduce sulfur oxides in the stack gases;

(d) passing the stack gas flow from the second catalytic flow-through bed through a third catalytic flow-through bed comprised of calcium zeolite of natural zeolite particles of a majority between 78 μm and 204 μm at a temperature above the dew point between 125° F. and 500° F. and a pressure between 3 psi and 200 psi adapted to reduce nitrogen oxides in the stack gases and providing a stack gas flow exiting the third catalytic bed with at least 70% reduction in sulfur oxides, nitrogen oxides and carbon oxide; and (e) purging residuals from the first catalytic bed, the second catalytic bed, and the third catalytic bed by intermittently passing nitrogen through the beds to remove residuals collected from the stack gas flow by the beds.

23. The method of drying and cleaning stack gas as claimed in claim 22 where the pair of electrodes in the gas flow upstream of the first catalytic flow-through bed insulated from containment of the gas flow applies such D.C. voltage less than 34 volts to ionize water vapor in the gas flow and reduce moisture content of the gas flow in the catalytic flow-through beds.

24. The method of drying and cleaning stack gas as claimed in claim 22 comprising the additional step of passing the gas flow through a venturi positioned downstream of the third catalytic flow-through bed to stabilize the gas flow through the beds.

25. The method of drying and cleaning stack gas as claimed in claim 22 where the electrodes in step (a) are positioned in the gas flow downstream of a baghouse.

26. The method of drying and cleaning stack gas as claimed in claim 22 where the stack gas flow sequentially circulated past the pair of electrodes and through the first catalytic flow-through bed, the second catalytic flow-through bed, and the third catalytic flow-through bed also removes from the gas flow at least 50% of mercury in all forms.

27. The method of drying and cleaning stack gas as claimed in claim 22 where the gas flow sequentially circulated past the pair of electrodes and through the first catalytic flow-through bed, the second catalytic flow-through bed, and the third catalytic flow-through bed also removes from the gas flow at least 70% of mercury in all forms.

28. The method of drying and cleaning stack gas as claimed in claim 22 comprising in addition a fourth catalytic flow-through bed comprised of calcium zeolite of natural zeolite particles between 44 μm and 64 μM in size positioned in the stack gas flow after the pair of electrodes and before the first catalytic bed with an electrical charge on said fourth catalytic flow-through bed to separately collect bauxite compounds from the stack gas flow before passing through the first catalytic bed.

29. The method of drying and cleaning stack gas as claimed in claim 28 the stack gas exiting a stack from the third catalytic bed has at least 90% reduction in bauxite compounds, carbon oxides, sulfur oxides, and nitrogen oxides compared to the stack gas flow delivered through the stack.

30. The method of drying and cleaning stack gas as claimed in claim 22 where at least two series of stack gas flows are provided in parallel to provide for the gas flow to past the same or a different pair of electrodes inline and through first catalytic bed, second catalytic bed, and third catalytic beds so that at least one in one of the series of beds can be purged while the stack gas flow can be dried and cleaned through a pair of electrodes and beds.

31. A method of drying and cleaning stack gases comprising the steps of:
    (a) passing a stack gas flow of less than 7% oxygen selected from the group consisting of volatiles from combustion of coal or from combustion of natural gas or from a cement kiln by a pair of electrodes positioned generally inline in the gas flow and applying a D.C. voltage between the electrodes to ionize water vapor in the gas flow without creating substantial amounts of hydrogen gas and reduce moisture content of the gas flow,
    (b) passing the gas flow from the pair of electrodes through a first catalytic flow-through bed comprised of calcium zeolite of natural zeolite particles at a temperature above the dew point between 125° F. and 500° F. and a pressure between 3 psi and 200 psi adapted to reduce carbon oxides from the stack gases and increase oxygen levels in the stack gas;
    (c) passing the gas flow from the first catalytic flow-through bed through a second catalytic flow-through bed comprised of a blend between 25 and 75% of sodium zeolite and calcium zeolite of natural sodium and calcium zeolite particles at a temperature above the dew point between 125° F. and 500° F. and a pressure between 3 psi and 200 psi adapted to reduce sulfur oxides from the stack gases and increase oxygen levels in the stack gas; and
    (d) passing the gas flow from the second catalytic flow-through bed through a third catalytic flow-through bed comprised of calcium zeolite of natural zeolite particles at a temperature above the dew point between 125° F. and 500° F. and a pressure between 3 psi and 200 psi adapted to reduce nitrogen oxides in the stack gases and increase oxygen levels in the stack gas and providing gas exiting the third catalytic bed with at least 70% reduction in sulfur oxides, nitrogen oxides and carbon oxide and greater than 15% oxygen.

32. The method of drying and cleaning stack gas as claimed in claim 31 where the pair of electrodes in the gas flow upstream of the first catalytic flow-through bed insulated from containment of the gas flow applies the D.C. voltage to ionize water vapor in the gas flow less than 34 volts and reduce moisture content of the gas flow in the catalytic flow-through beds.

33. The method of drying and cleaning stack gas as claimed in claim 31 comprising the additional step of passing the gas flow through a venturi positioned downstream of the third catalytic flow-through bed to stabilize the gas flow through the beds.

34. The method of drying and cleaning stack gas as claimed in claim 31 where the pair of electrodes in step (a) are positioned in the gas flow downstream of a baghouse.

35. The method of drying and cleaning stack gas as claimed in claim 31 where the stack gas flow sequentially circulated past the pair of electrodes and through the first catalytic flow-through bed, the second catalytic flow-through bed, and the third catalytic flow-through bed also removes from the gas flow at least 50% of mercury in all forms.

36. The method of drying and cleaning stack gas as claimed in claim 31 where the gas flow sequentially circulated past the pair of electrodes and through the first catalytic flow-through bed, the second catalytic flow-through bed, and the third catalytic flow-through bed also removes from the gas flow at least 70% of mercury in all forms.

37. The method of drying and cleaning stack gas as claimed in claim 31 comprising in addition a fourth catalytic flow-through bed comprised of calcium zeolite of natural zeolite particles between 44 μm and 64 μm in size positioned in the stack gas flow after the pair of electrodes and before the first catalytic bed with an electrical charge on said fourth catalytic flow-through bed to separately collect bauxite compounds from the stack gas flow before passing through the first catalytic bed.

38. The method of drying and cleaning stack gas as claimed in claim 37 the stack gas exiting a stack from the third catalytic bed has at least 70% reduction in bauxite compounds, carbon oxides, sulfur oxides, nitrogen oxides, and mercury oxide compared to the stack gas flow delivered through the stack.

39. The method of drying and cleaning stack gas as claimed in claim 37 the stack gas exiting a stack from the third catalytic bed has at least 90% reduction in bauxite compounds, carbon oxides, sulfur oxides, nitrogen oxides, and mercury oxide compared to the stack gas flow delivered through the stack.

40. The method of drying and cleaning stack gas as claimed in claim 31 where at least two series of stack gas flows are provided in parallel to pass a pair of electrodes inline and through a series of the first catalytic bed, the second catalytic bed, and the third catalytic bed so that one stack gas flow can be dried and cleaned by the method described while another stack gas flow is purges for reuse.

41. A method of drying and cleaning stack gases comprising the steps of:
    (a) passing a stack gas flow selected from the group consisting of volatiles from combustion of coal or from combustion of natural gas or from a cement kiln by a pair of electrodes positioned generally inline in the gas flow and applying a D.C. voltage between the electrodes to ionize water vapor in the gas flow without creating substantial amounts of hydrogen gas and reduce moisture content of the gas flow;
    (b) passing the gas flow from the pair of electrodes through a first catalytic flow-through bed comprised of calcium zeolite with a porosity of a total surface area not greater than 1200 $m^2/g$ to reduce carbon oxides from the stack gases and increase oxygen levels in the stack gas;
    (c) passing the gas flow from the first catalytic flow-through bed through a second catalytic flow-through bed comprised of a blend between 25 and 75% of sodium zeolite and calcium zeolite with a porosity of a total surface area not greater than 1200 $m^2/g$ to reduce sulfur oxides from the gas flow and increase oxygen levels in the gas flow; and (d) passing the gas flow from the second catalytic flow-through bed through a third catalytic flow-through bed comprised of calcium zeolite of natural zeolite particles with a porosity of a total surface area not greater than 1200 m²/g and providing gas exiting the third catalytic bed with at least 70% reduction in sulfur oxides, nitrogen oxides and carbon oxide and greater than 15% oxygen.

42. The method of drying and cleaning stack gas as claimed in claim 41 where the pair of electrodes in the gas flow upstream of the first catalytic flow-through bed is insulated from containment of the gas flow with the D.C. voltage applied to the electrode to ionize water vapor in the gas flow without creating substantial amounts of hydrogen gas and reduce moisture content of the gas flow in the catalytic flow-through beds.

43. The method of drying and cleaning stack gas as claimed in claim 41 comprising the additional step of passing the gas flow through a venturi positioned downstream of the third catalytic flow-through bed to stabilize the gas flow through the beds.

44. The method of drying and cleaning stack gas as claimed in claim 41 where the electrodes in step (a) are positioned in the gas flow downstream of a baghouse.

45. The method of drying and cleaning stack gas as claimed in claim 41 where the stack gas flow sequentially circulated past the pair of electrodes and through the first catalytic flow-through bed, the second catalytic flow-through bed, and the third catalytic flow-through bed also removes from the gas flow at least 50% of mercury in all forms.

46. The method of drying and cleaning stack gas as claimed in claim 41 where the gas flow sequentially circulated past the pair of electrodes and through the first catalytic flow-through bed, the second catalytic flow-through bed, and the third catalytic flow-through bed also removes from the gas flow at least 70% of mercury in all forms.

47. The method of drying and cleaning stack gas as claimed in claim 41 comprising in addition a fourth catalytic flow-through bed comprised of calcium zeolite of natural zeolite particles with a porosity of a total surface area not greater than 1200 m²/g positioned in the stack gas flow after the pair of electrodes and before the first catalytic bed with an electrical charge to separately collect bauxite compounds from the stack gas flow before passing through the first catalytic bed.

48. The method of drying and cleaning stack gas as claimed in claim 47 the stack gas exiting a stack from the third catalytic bed has at least 70% reduction in bauxite compounds, carbon oxides, sulfur oxides, nitrogen oxides, and mercury oxide compared to the stack gas flow delivered to the stack.

49. The method of drying and cleaning stack gas as claimed in claim 47 the stack gas exiting a stack from the third catalytic bed has at least 90% reduction in bauxite compounds, carbon oxides, sulfur oxides, nitrogen oxides, and mercury oxide compared to the stack gas flow delivered to the stack.

50. The method of drying and cleaning stack gas as claimed in claim 41 where at least two series of stack gas flows are provided in parallel to pass a pair of electrodes inline and through the first catalytic bed, the second catalytic bed, and the third catalytic bed so that one stack gas flow can be dried and cleaned by the method described while another stack gas flow is purged.

51. The method of drying and cleaning stack gas as claimed in claim 41 the stack gas exiting a stack from the third catalytic bed has at least 70% reduction in bauxite compounds, carbon oxides, sulfur oxides, nitrogen oxides, and mercury oxide compared to the stack gas flow delivered through the stack.

52. The method of drying and cleaning stack gas as claimed in claim 41 the stack gas exiting a stack from the third catalytic bed has at least 90% reduction in bauxite compounds, carbon oxides, sulfur oxides, nitrogen oxides, and mercury oxide compared to the stack gas flow delivered through the stack.

53. A fertilizer product produced by the steps of:
(a) passing a stack gas flow selected from the group consisting of volatiles from combustion of coal or from combustion of natural gas or from a cement kiln by a pair of electrodes positioned generally inline in the gas flow and applying a D.C. voltage between the electrodes to ionize water vapor in the gas flow without creating substantial amounts of hydrogen gas and reduce moisture content of the gas flow,
(b) passing the gas flow from the pair of electrodes through a first catalytic flow-through bed comprised of calcium zeolite of natural zeolite particles of a majority between 44 μm and 64 μm in size at a temperature above the dew point between 125° F. and 500° F. and a pressure between 3 psi and 200 psi adapted to reduce carbon oxides in the stack gases;
(c) passing the gas flow from the first catalytic flow-through bed through a second catalytic flow-through bed comprised of a blend between 25 and 75% of sodium zeolite and calcium zeolite of natural sodium and calcium zeolite particles of a majority between 65 μm and 125 μm in size at a temperature above the dew point between 125° F. and 500° F. and a pressure between 3 psi and 200 psi adapted to reduce sulfur oxides in the stack gas flow;
(d) passing the gas flow from the second catalytic flow-through bed through a third catalytic flow-through bed comprised of calcium zeolite of natural zeolite particles of a majority between 78 μm and 204 μm at a temperature above the dew point between 125° F. and 500° F. and a pressure between 3 psi and 200 psi adapted to reduce nitrogen oxides in the stack gas flow and providing gas exiting the third catalytic bed with at least 70% reduction in sulfur oxides, nitrogen oxides and carbon oxide; and
(e) purging residuals from the first catalytic bed, the second catalytic bed, and the third catalytic bed by intermittently passing nitrogen through the beds to remove residuals collected from the stack gases by the beds.

54. A fertilizer product produced by the steps of:
(a) passing a stack gas flow of less than 7% oxygen selected from the group consisting of volatiles from combustion of coal or from combustion of natural gas or from a cement kiln by at least two electrodes positioned generally inline in the gas flow and applying a D.C. voltage between the electrodes to ionize water vapor in the gas flow without creating substantial amounts of hydrogen gas and reduce moisture content of the gas flow,
(b) passing the gas flow from the electrodes through a first catalytic flow-through bed comprised of calcium zeolite of natural zeolite particles at a temperature above the dew point between 125° F. and 500° F. and a pressure between 3 psi and 200 psi adapted to reduce carbon oxides from the stack gases and increase oxygen levels in the stack gas;
(c) passing the gas flow from the first catalytic flow-through bed through a second catalytic flow-through bed comprised of a blend between 25 and 75% of sodium zeolite and calcium zeolite of natural sodium and calcium zeolite particles of at a temperature above the dew point between 125° F. and 500° F. and a pressure between 3 psi and 200 psi adapted to reduce sulfur oxides from the stack gases and increase oxygen levels in the stack gas; and (d) passing the gas flow from the second catalytic flow-through bed through a third catalytic flow-through bed comprised of calcium zeolite of natural zeolite particles at a temperature above the dew point between 125° F. and 500° F. and a pressure between 3 psi and 200 psi adapted to reduce nitrogen oxides in the stack gases and increase oxygen levels in the stack gas flow; and providing gas flow exiting the third catalytic bed with at least 70% reduction in sulfur oxides, nitrogen oxides and carbon oxide and greater than 15% oxygen.

55. A fertilizer product produced by the steps of:

(a) passing a stack gas flow from the group consisting of volatiles from combustion of coal or from combustion of natural gas or from a cement kiln by a pair of electrodes positioned generally inline in the gas flow and applying a D.C. voltage between the electrodes to ionize water vapor in the gas flow without creating substantial amounts of hydrogen gas and reduce moisture content of the gas flow;

(b) passing the gas flow from the pair of electrodes though through a first catalytic flow-through bed comprised of natural calcium zeolite with a porosity of a total surface area of not greater than 1200 $m^2/g$ adapted to reduce carbon oxides in a stack gas;

(c) passing the gas flow from the first catalytic flow-through bed through a second catalytic flow-through bed comprised of a blend of natural sodium zeolite and natural calcium zeolite with a porosity of a total surface area of not greater than 1200 $m^2/g$ adapted to reduce sulfur oxides in a stack gas with the blend of sodium zeolite and calcium zeolite between 25 and 75%;

(d) passing the gas flow from second catalytic flow-through bed through third catalytic flow-through bed comprised of natural calcium zeolite with a porosity of a total surface area not greater than 1200 $m^2/g$ adapted to reduce nitrogen oxides in a stack gas and providing gas exiting the third catalytic bed with at least 70% reduction in carbon oxides, sulfur oxides, and nitrogen oxides; and (e) purging residuals collected on the first catalytic bed, the second catalytic bed, and the third catalytic bed and collecting said residuals purged from the first catalytic bed, the second catalytic bed, and the third catalytic bed to provide a fertilizer product.

56. A method of drying and cleaning stack gases comprising the steps of:

(a) passing a contained stack gas flow selected from the group consisting of volatiles from combustion of coal or from combustion of natural gas or from a cement kiln by a pair of electrodes positioned generally inline in the gas flow and applying D.C. voltage between the electrodes to ionize water vapor in the gas flow without creating substantial amounts of hydrogen gas and reduce moisture content of the gas flow in the first catalytic flow-through bed;

(b) passing stack gas flow from the electrodes through a catalytic flow-through bed comprised of a mixture of calcium zeolite of natural zeolite particles of a majority between 44 μm and 64 μm in size, a blend between 25 and 75% of sodium zeolite and calcium zeolite of natural sodium and calcium zeolite particles of a majority between 65 μm and 125 μm in size, and calcium zeolite of natural zeolite particles of a majority between 78 μm and 204 μm at a temperature above the dew point between 125° F. and 500° F. and a pressure between 3 psi and 200 psi adapted to reduce carbon oxides in the stack gas flow, the mixture with a porosity of a total surface area not greater than 1200 $m^2/g$; and (c) operating the stack gas flow sequentially past the pair of electrodes and through the catalytic bed to provide at least 70% reduction in sulfur oxides, nitrogen oxides and carbon oxide.

57. The method of drying and cleaning stack gas as claimed in claim 56 where the pair of electrodes in the gas flow upstream of the catalytic flow-through bed insulated from containment of the gas flow applies a D.C. voltage of less than 34 volts to ionize water vapor in the gas flow and reduce moisture content of the gas flow in the catalytic flow-through bed.

58. The method of drying and cleaning stack gas as claimed in claim 56 comprising the additional step of passing the gas flow through a venturi positioned downstream of the catalytic flow-through bed to stabilize the gas flow through the beds.

59. The method of drying and cleaning stack gas as claimed in claim 56 where the electrodes in step (a) are positioned in the gas flow downstream of a baghouse.

60. The method of drying and cleaning stack gas as claimed in claim 56 where the stack gas flow sequentially circulated past the pair of electrodes and through the catalytic flow-through bed also removes from the gas flow at least 50% of mercury in all forms.

61. The method of drying and cleaning stack gas as claimed in claim 56 where the gas flow sequentially circulated past the pair of electrodes and through the catalytic flow-through beds also removes from the gas flow at least 70% of mercury in all Runs.

62. The method of drying and cleaning stack gas as claimed in claim 56 comprising in addition a second catalytic flow-through bed comprised of calcium zeolite of natural zeolite particles with a porosity of a total surface area not greater than 1200 $m^2/g$ positioned in the stack gas flow after the pair of electrodes and before the first catalytic bed, with an electrical charge applied to the second catalytic flow-through bed, to separately collect bauxite compounds from the stack gas flow before passing through the first catalytic bed.

63. The method of drying and cleaning stack gas as claimed in claim 62 the stack gas exiting a stack from the first catalytic bed has at least 70% reduction in bauxite compounds, carbon oxides, sulfur oxides, nitrogen oxides, and mercury oxide compared to the stack gas flow delivered to the stack.

64. The method of drying and cleaning stack gas as claimed in claim 62 the stack gas exiting a stack from the first catalytic bed has at least 90% reduction in bauxite compounds, carbon oxides, sulfur oxides, nitrogen oxides, and mercury oxide compared to the stack gas flow delivered to the stack.

65. The method of drying and cleaning stack gas as claimed in claim 56 where at least two series of stack gas flows are provided in parallel to pass the same or a different pair of electrodes generally inline and through first catalytic flow-through bed, second catalytic flow-through bed, and third catalytic flow-through beds so that the stack gas flow can be dried and cleaned by the method described while one or more other catalytic flow-through beds are purged.

* * * * *

UNITED STATES PATENT AND TRADEMARK OFFICE
CERTIFICATE OF CORRECTION

PATENT NO. : 9,919,269 B2  
APPLICATION NO. : 15/067569  
DATED : March 20, 2018  
INVENTOR(S) : James Gary Davidson Page 1 of 1

It is certified that error appears in the above-identified patent and that said Letters Patent is hereby corrected as shown below:

In the Specification

In Column 11, Line 54, delete "clean;" and substitute therefor --cleaning;--.

In Column 12, Line 29, delete "$H_2$" and substitute therefor --$H_2+$--.

In the Claims

In Column 27, Line 25, (tenth line of Claim 55), delete "though".

In Column 28, Line 35, (last line of Claim 61), delete "Runs." and substitute therefor --forms.--.

Signed and Sealed this  
First Day of May, 2018

Andrei Iancu  
*Director of the United States Patent and Trademark Office*